US012165474B2

(12) United States Patent
Morris

(10) Patent No.: US 12,165,474 B2
(45) **Date of Patent: *Dec. 10, 2024**

(54) SLOT MACHINE GAME WITH NEGATIVE BONUS ACCUMULATOR

(71) Applicant: DK Crown Holdings Inc., Boston, MA (US)

(72) Inventor: Kyle Morris, Las Vegas, NV (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,724

(22) Filed: Oct. 10, 2022

(65) Prior Publication Data

US 2023/0298436 A1 Sep. 21, 2023

Related U.S. Application Data

(63) Continuation of application No. 17/682,389, filed on Feb. 28, 2022, now Pat. No. 11,468,743.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ...................................................... G07F 17/34
See application file for complete search history.

(56) References Cited

U.S. PATENT DOCUMENTS

2010/0120495 A1* 5/2010 Frank .................. G07F 17/3244 463/20
2011/0269518 A1* 11/2011 Carbonaro .......... G07F 17/3223 463/9
2016/0078714 A1 3/2016 Gilmore et al.

OTHER PUBLICATIONS

Non-Final Office Action on U.S. Appl. No. 17/682,389 dated May 25, 2022.
Notice of Allowance on U.S. Appl. No. 17/682,389 dated Sep. 1, 2022.
Office Action on CA Appl. No. 3191049 dated Aug. 7, 2024.

* cited by examiner

*Primary Examiner* — Kevin Y Kim
(74) *Attorney, Agent, or Firm* — Foley & Lardner LLP

(57) ABSTRACT

Systems and methods for providing bonus games based on positive and negative bonus accumulators are disclosed. The gaming system can generate, responsive to receiving an indication to begin a play of a game, a grid of symbols. Each symbol can have an attribute corresponding to one or more of a positive bonus value, a negative bonus value, and a credit value. The gaming system can calculate a positive accumulator value, a negative accumulator value, and a credit accumulator value based on the attribute. The gaming system can detect a condition to initiate a bonus game, and execute the bonus game based on the positive accumulator value and the negative accumulator value. The gaming system can adjust, responsive to executing the bonus game, a credit balance based on an outcome of the bonus game and the credit accumulator value.

18 Claims, 15 Drawing Sheets

300H

300

SLOT MACHINE GAME WITH NEGATIVE BONUS ACCUMULATOR

CROSS-REFERENCE TO RELATED APPLICATIONS

The present application claims is a continuation of and claims priority to U.S. patent application Ser. No. 17/682,389, filed Feb. 28, 2022, and entitled "SLOT MACHINE GAME WITH NEGATIVE BONUS ACCUMULATOR," the contents of which is incorporated herein by reference in its entirety for all purposes.

BACKGROUND

Gaming machines or devices, such as networked gaming devices, can provide awards as a result of gaming events. Players generally place wagers to activate a game, and can receive an award when a winning condition is met.

SUMMARY

In conventional wager based games, it can be challenging to provide engaging interactive gaming content using wagers alone. It is therefore advantageous for a system to provide additional engagement features, such as bonus award features based on negative and positive bonus accumulators, in interactive gaming content. Conventional interactive gaming content does not include additional bonus features that are randomly generated, nor do such bonus features provide additional opportunities for gaming strategies that are separate from an outcome of a base game. Randomly generated bonus award amounts, or bonus awards that occur based on random events in a bonus game, can increase end user engagement with games and interactive content. Further, cloud computing allows for the distributed provisioning and processing of interactive gaming features across many end user devices, thereby providing improved performance when compared to other implementations. Thus, the systems and methods of this technical solution provide a technical improvement to gaming devices by providing additional, randomly generated engagement features, including negative and positive bonus accumulators that affect an outcome of a bonus game.

At least one aspect of the present disclosure relates to a system configured for utilizing a negative bonus accumulator in a gaming system. The system may include one or more processors coupled to a non-transitory memory. The system can generate, responsive to receiving an indication to begin a play of a game, a grid of a plurality of symbols. Each of the plurality of symbols may have an attribute corresponding to one or more of a positive bonus value, a negative bonus value, and a credit value. The system can calculate a positive accumulator value, a negative accumulator value, and a credit accumulator value based on the attribute of each of the plurality of symbols. The system can detect a condition to initiate a bonus game. The system can execute the bonus game based on the positive accumulator value and the negative accumulator value. The system can adjust, responsive to executing the bonus game, a credit balance based on an outcome of the bonus game and the credit accumulator value.

In some implementations, the system can adjust the credit balance further based on an award amount associated with at least one symbol of the plurality of symbols prior to executing the bonus game. In some implementations, the system can adjust the credit balance based on an arrangement of the at least one symbol in the grid. In some implementations, the system can present the positive accumulator value and the negative accumulator value at a display device. In some implementations, the system can receive a second input including a request to generate a second grid of a second plurality of symbols.

In some implementations, the system can calculate the positive accumulator value or the negative accumulator value at least in part based on an arrangement of the plurality of symbols in the grid. In some implementations, an outcome of the bonus game may depend at least in part on the positive accumulator value, the negative accumulator value, and at least one random value. In some implementations, the system can generate display instructions to present the grid of the plurality of symbols at a display device in communication with the one or more processors responsive to generating the grid of the plurality of symbols. In some implementations, the system can detect the condition to initiate the bonus game responsive to a determination that a predetermined number of plays of the game have been conducted since the bonus game was last executed. In some implementations, the system can detect the condition to initiate the bonus game responsive to a user input.

One other aspect of the present disclosure relates to a method for utilizing a negative bonus accumulator in a gaming system. The method can include generating, responsive to receiving an indication to begin a play of a game, a grid of a plurality of symbols. Each of the plurality of symbols can have an attribute corresponding to one or more of a positive bonus value, a negative bonus value, and a credit value. The method can include calculating a positive accumulator value, a negative accumulator value, and a credit accumulator value based on the attribute of each of the plurality of symbols. The method can include detecting a condition to initiate a bonus game. The method can include executing the bonus game based on the positive accumulator value and the negative accumulator value. The method can include adjusting, responsive to executing the bonus game, a credit balance based on an outcome of the bonus game and the credit accumulator value.

In some implementations of the method, it can include further including adjusting the credit balance further based on an award amount associated with at least one symbol of the plurality of symbols prior to executing the bonus game. In some implementations of the method, it can include further including adjusting the credit balance based on an arrangement of the at least one symbol in the grid. In some implementations of the method, it can further include presenting the positive accumulator value and the negative accumulator value at a display device. In some implementations of the method, it can further include receiving a second input including a request to generate a second grid of a second plurality of symbols.

In some implementations of the method, it can further include calculating the positive accumulator value or the negative accumulator value at least in part based on an arrangement of the plurality of symbols in the grid. In some implementations of the method, an outcome of the bonus game can depend at least in part on the positive accumulator value, the negative accumulator value, and at least one random value. In some implementations of the method, it can further include generating display instructions to present the grid of the plurality of symbols at a display device in communication with the one or more processors responsive to generating the grid of the plurality of symbols. In some implementations of the method, it can further include detecting the condition to initiate the bonus game responsive to determining that a predetermined number of plays of the game have been conducted since the bonus game was last executed. In some implementations of the method, it can include detecting the condition to initiate the bonus game responsive to a user input.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for providing games having additional bonus opportunities. The various concepts introduced above and discussed in greater detail below may be implemented in any of numerous ways, as the described concepts are not limited to any particular manner of implementation. Examples of specific implementations and applications are provided primarily for illustrative purposes For purposes of reading the description of the various implementations below, the following descriptions of the sections of the Specification and their respective contents may be helpful:

Section A describes a network environment and computing environment which may be useful for practicing embodiments described herein; and Section B describes systems and methods for gaming systems with bonus award opportunities based on positive and negative bonus accumulators.

A. Computing and Network Environment

Figure 1A:
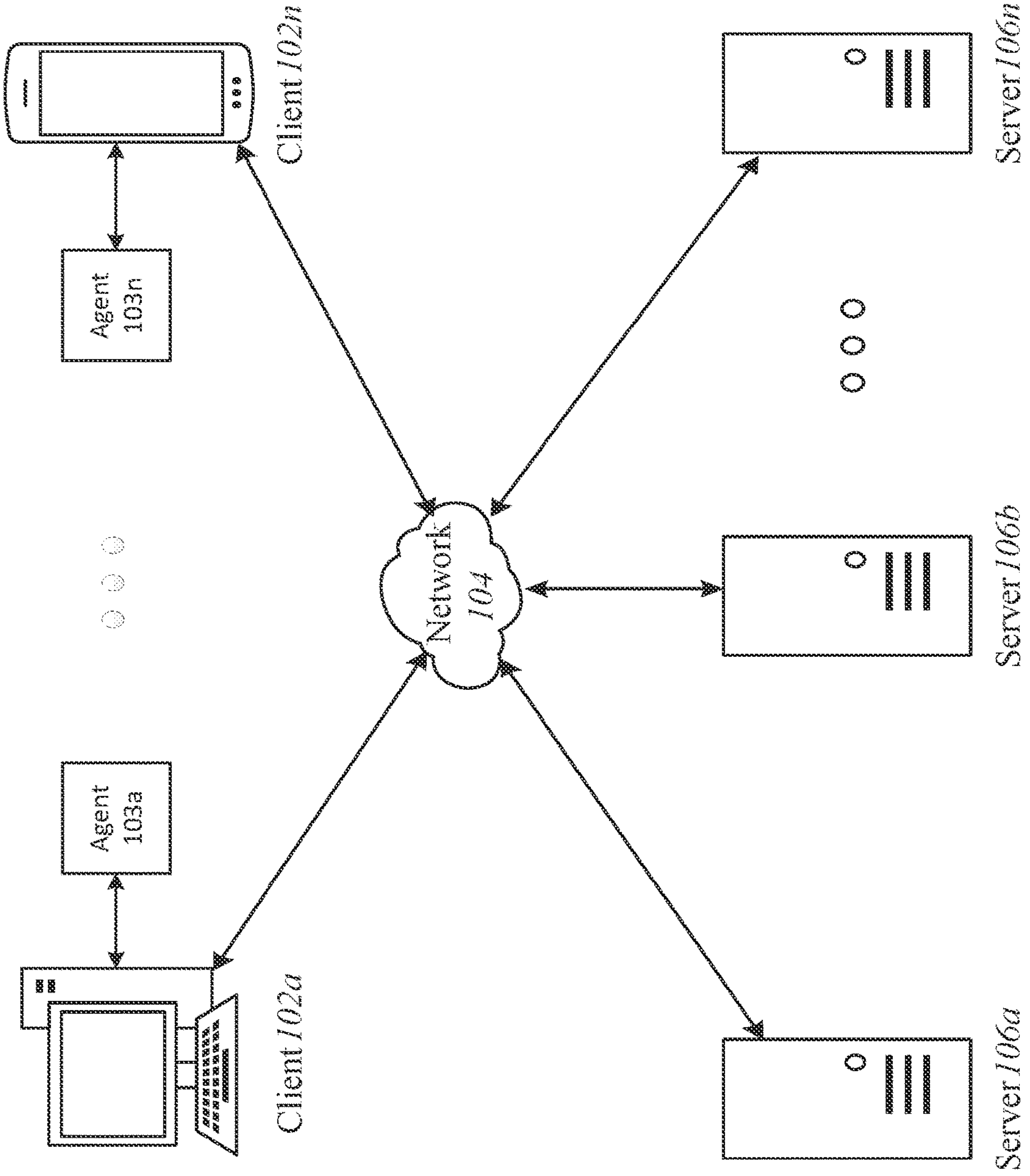
FIG. 1A is a block diagram depicting an embodiment of a network environment comprising a client device in communication with a server device.

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102*a*-102*n* (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103*a*-103*n* and one or more servers 106*a*-106*n* (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102*a*-102*n*.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or remote machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Figure 1B:
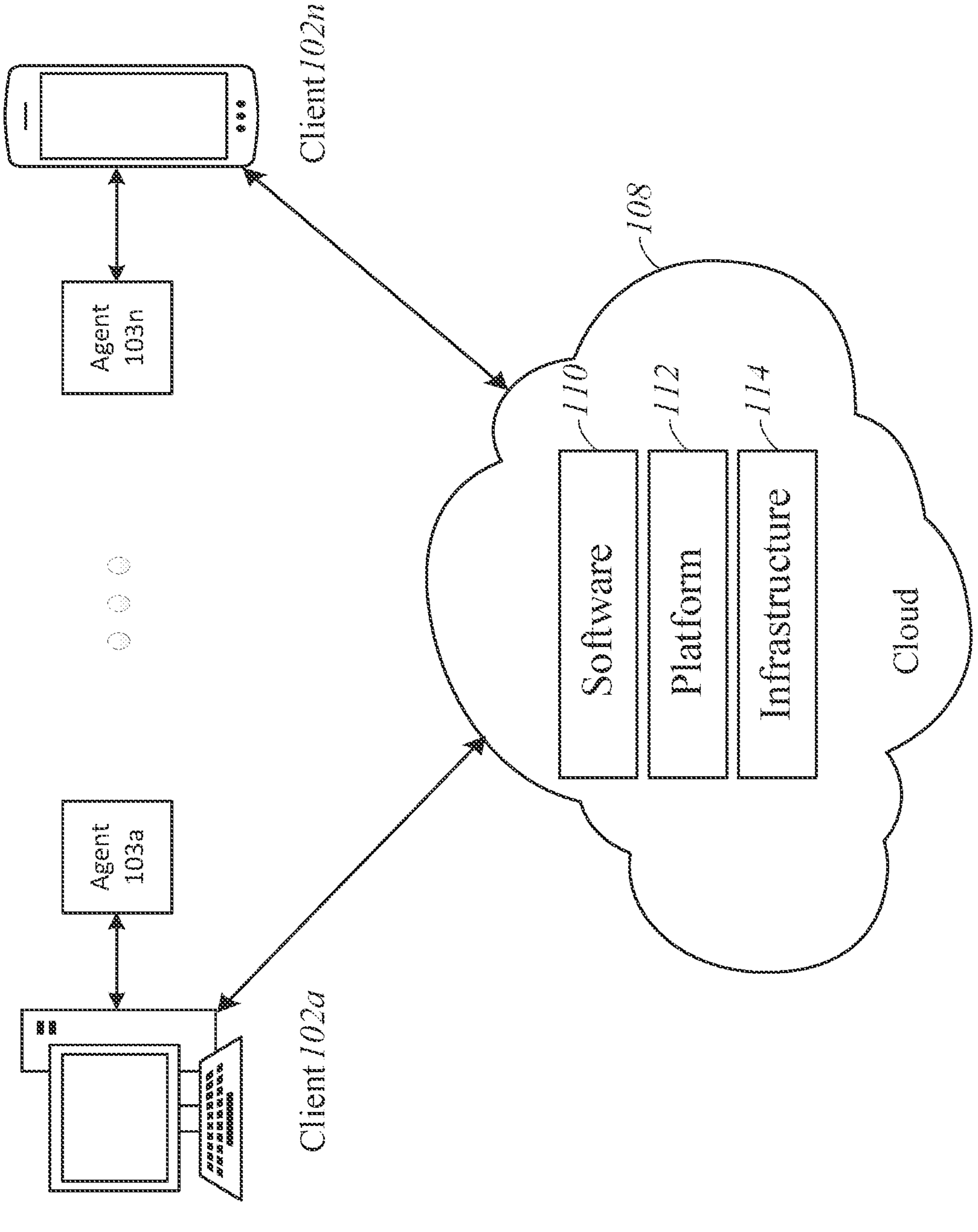
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102*a*-102*n*, in communication with respective agents 103*a*-103*n* and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
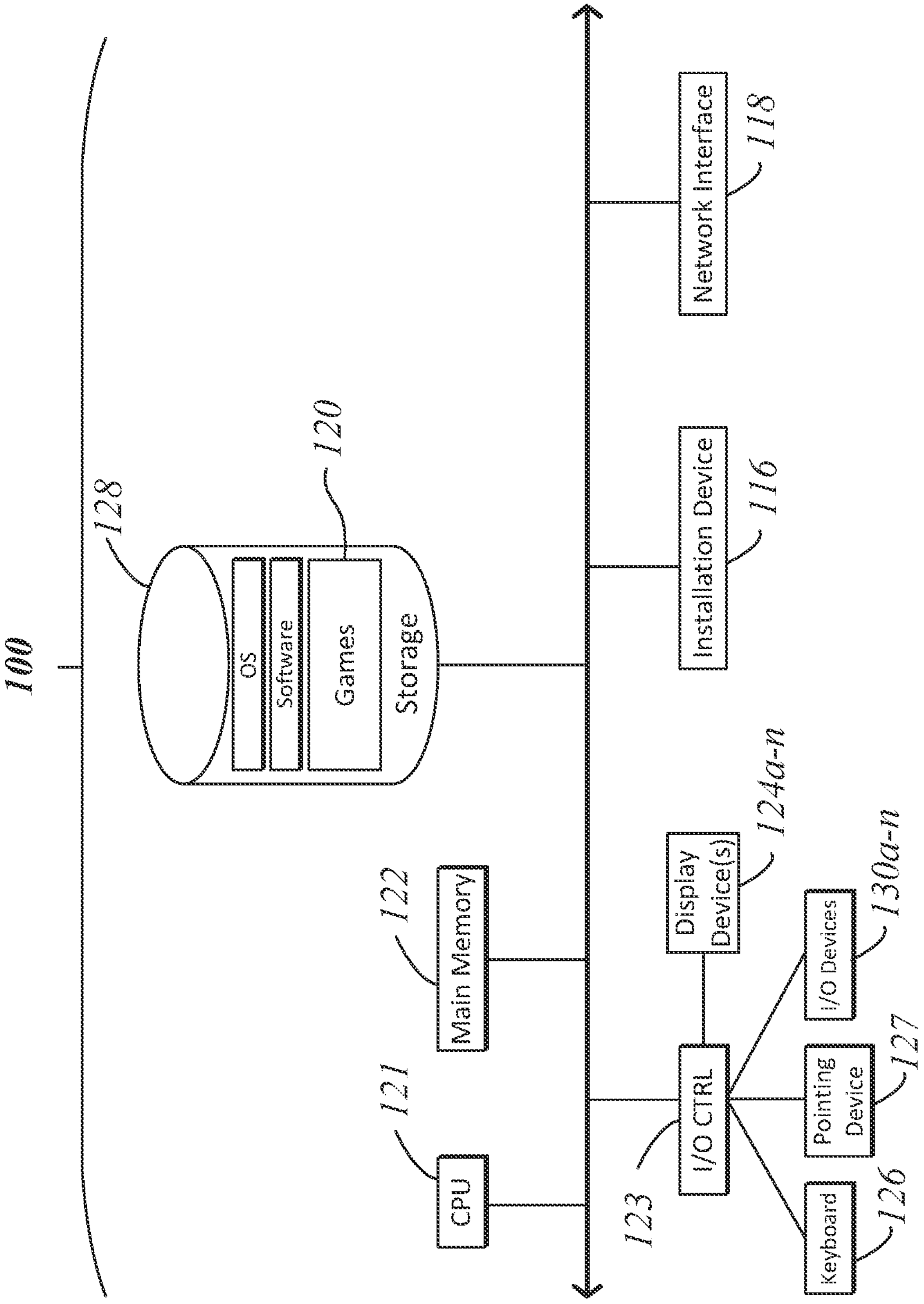
FIGS. 1C and 1D are block diagrams depicting embodiments of computing devices useful in connection with the methods and systems described herein.
Figure 1D:
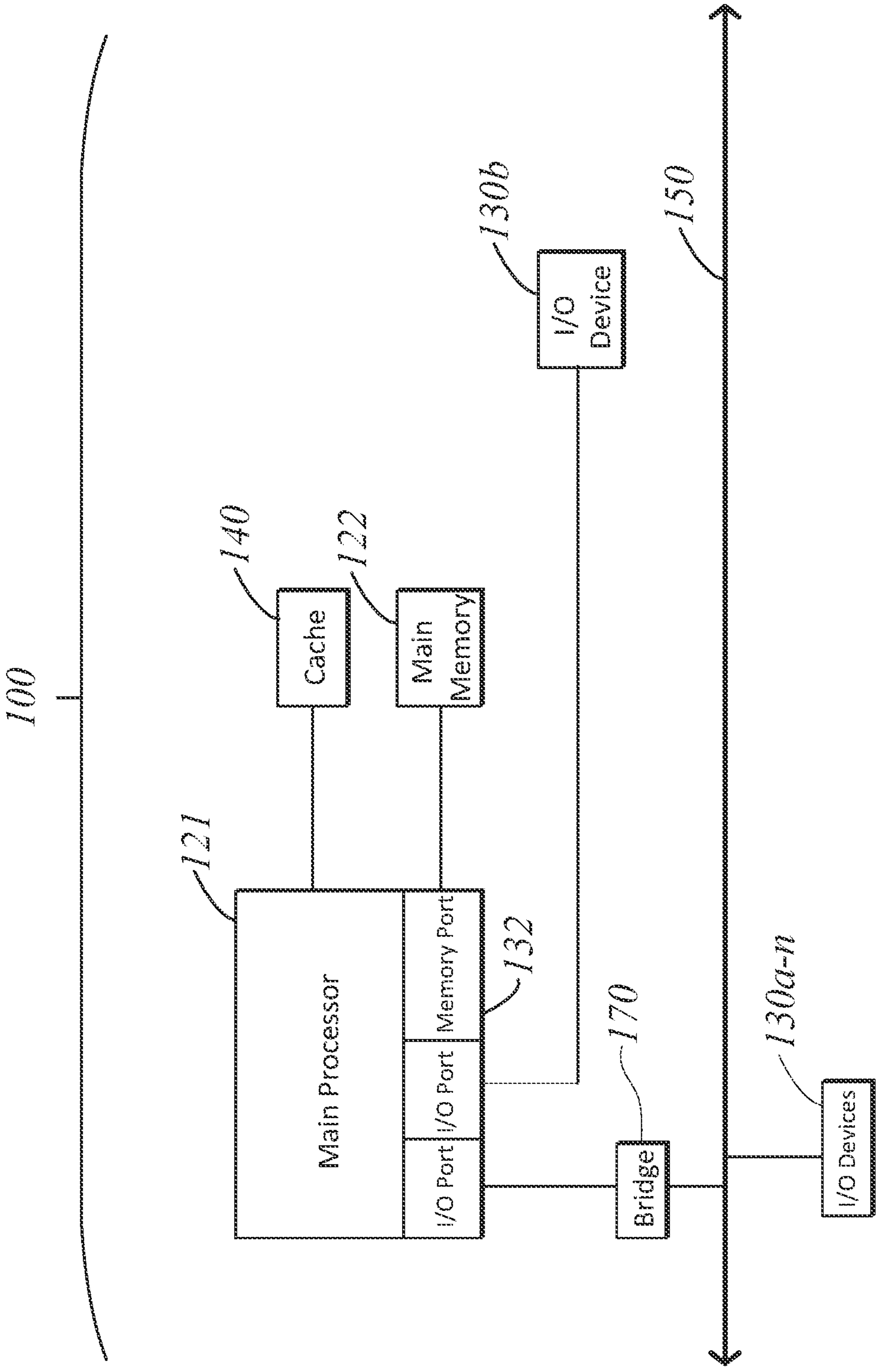

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124*a*-124*n*, a keyboard 126 and a pointing device 127, e.g. a mouse. The storage device 128 may include, without limitation, an operating system, software, and games 120, which can implement any of the features of the gaming system 205 described herein below in conjunction with FIG. 2. As shown in FIG. 1D, each computing device 100 may also include additional optional elements, e.g. a memory port 132, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus 150 while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provides for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now or Google Voice Search.

Additional devices 130*a*-130*n* have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augment reality devices. The I/O devices 130*a*-130*n* may be controlled by an I/O controller 123 as shown in FIG. 1C. The I/O controller 123 may control one or more I/O devices 130*a*-130*n*, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g. one or more hard disk drives or redundant arrays of independent disks) for storing an operating system or other related software, and for storing application software programs such as any program related to the games 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g. KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102*a*-102*n* may access over a network 104. An application distribution platform 112 may include application developed and provided by various developers. A user of a client device 102 may select, purchase and/or download an application via the application distribution platform 112.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Gaming Systems with Bonus Games Based on Positive and Negative Accumulators

The systems and methods of this technical solution provide techniques for improved gaming systems that award additional bonus games with outcomes that depend partly on both positive and negative bonus accumulators. The positive and negative bonus accumulators can accumulate, for example, based on randomly generated outcomes of a base game. The values of the positive and negative bonus accumulators can influence the gaming behaviors of players, thereby diversifying and increasing strategy considerations when playing the base game. Therefore, the systems and methods of this technical solution extend the conventional functionality of gaming systems by providing additional bonus award opportunities and play strategies.

The gaming systems described herein can be implemented, for example, in a computing environment, or in a cloud computing environment, such as the cloud computing environment 108 described herein above in conjunction with FIGS. 1A and 1B. In general, gaming systems can provide wagering opportunities that allow a user to risk a specified amount of credits for the opportunity to win more credits. One example is a simple slot machine-type game, in which a player risks a certain amount of credits for a chance at a randomly generated payout. Such payouts may be determined based on pay tables, or in some implementations, partly based on player input or skill. However, it should be understood that other payout schemes are possible.

The systems and methods described herein improve upon these conventional approaches by providing additional opportunities for the player to be awarded with additional credits, often accompanied by a corresponding risk taken by the player. To do so, the player can be presented with an opportunity to commence a bonus game, which may provide a bonus award based on both positive and negative accumulator values. These positive and negative accumulator values may increase or decrease over one or more plays of the base game. The bonus game may be initiated by a player or may be initiated in response to a condition being met (e.g., a predetermined number of plays of the base game, a predetermined number of credits accumulated, etc.), thereby offering additional strategy considerations for the player when interacting with the base game. The positive and negative accumulator values may be increased or decreased randomly in response to various in-game conditions, such as tiles appearing on a slot machine game, or other random conditions or events. As such, the positive and negative accumulators provide additional strategies for consideration by the player during plays of the base game, making each play more unique and more enjoyable when compared to a conventional gaming systems.

The systems and methods described herein leverage gaming technology (e.g., a networked gaming environment, a cloud, video gaming devices, etc.) to provide games with bonus award opportunities to end user devices, such as laptops, smart phones, personal computers, smart televisions, video gaming devices, or other such computing devices. Although in some implementations, certain aspects of the computing systems described herein are represented as taking place over a network, it should be understood that similar operations can take place on a gaming device, such as a video poker machine, or another type of independent gaming device that may not require communications between a gaming server and a separate gaming client to effectuate the operations described herein. These and other features of gaming devices are described in greater detail herein below.

Figure 2:
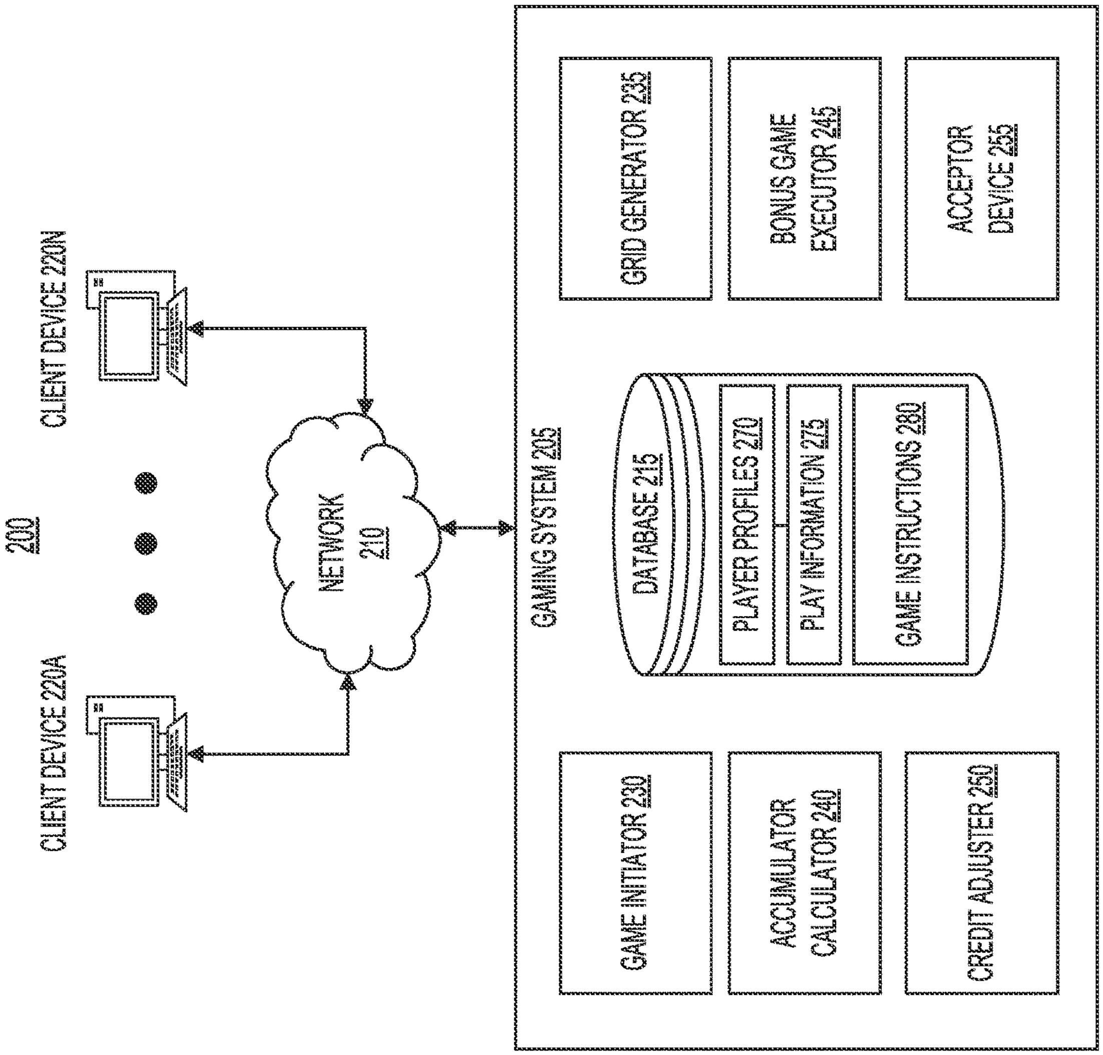
FIG. 2 is a block diagram of an example interactive system that provides a bonus game-based positive and negative bonus accumulators, in accordance with one or more implementations.

Referring now to FIG. 2, illustrated is a block diagram of an example system 200 for providing games having positive and negative bonus accumulators, in accordance with one or more implementations. The system 200 can include at least one gaming system 205, at least one network 210, and one or more client devices 220A-220N (sometimes generally referred to as client device(s) 220). The gaming system 205 can include at least one game initiator 230, at least one grid generator 235, at least one accumulator calculator 240, at least one bonus game executor 245, at least one credit adjuster 250, at least one acceptor 255, and at least one database 215. The database 215 can include one or more player profiles 270, one or more play information 275 data structures (sometimes generally referred to as the play information 275), and one or more game instructions 280 (sometimes generally referred to as the game instruction(s) 280). In some implementations, the database 215 can be external to the gaming system 205, for example, as a part of a cloud computing system or an external computing device in communication with the devices (e.g., the gaming system 205, the client devices 220, etc.) of the system 200 via the network 210, etc.).

Each of the components (e.g., the gaming system 205, the network 210, the client devices 220, the game initiator 230, the grid generator 235, the accumulator calculator 240, the bonus game executor 245, the credit adjuster 250, the database 215, etc.) of the system 200 can be implemented using the hardware components or a combination of software with the hardware components of a computing system, such as the computing system 100 detailed herein in conjunction with FIGS. 1A-1D, or any other computing system described herein. Each of the components of the gaming system 205 can perform the functionalities detailed herein.

The gaming system 205 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The gaming system 205 can include one or more computing devices or servers that can perform various functions as described herein. The gaming system 205 can include any or all of the components and perform any or all of the functions of the computer system 100 described herein in conjunction with FIGS. 1A-1D.

In some implementations, the gaming system 205 can be a slot machine or a video game machine. In such implementations, the gaming system 205 can include one or more displays and one or more I/O devices. Each of the one or more displays may be, for example, a video display (e.g., a liquid crystal display (LCD), a light-emitting diode (LED) display, an organic LED (OLED) display, etc.), or any display device capable a GUI. The displays may be a type of interactive display (e.g., a touchscreen, etc.) and may include one or more I/O devices (e.g., one or more buttons, a digital key pad, a touch pad, etc.). The display can include one or more portions, for example, to display multiple a base game with positive and negative accumulator values, such as the slot machine game shown in FIGS. 3A-3F, or a bonus game, such as the bonus game interfaces shown in FIGS. 3G-3I.

The display can include a border region (e.g., side border, top border, bottom border). In some implementations, the display can include a touch screen display, which can receive interactions from a user. The gaming system 205 may include a housing that houses the components of the gaming system 205, and including the one or more I/O devices (e.g., buttons, other physical input devices, etc.) and the display. Player interactions with the buttons or the display can result in signals that are detected by the gaming system 205 and stored as interaction data. The interaction data can include, for example, interaction coordinates, an interaction type (e.g., click, swipe, scroll, tap, etc.), and an indication of an actionable object with which the interaction occurred. Each client device 220 can include an input device that couples or communicates with the display of each client device to enable a user to interact with and/or select one or more actionable objects as described herein. The display can enable interaction with one or more visual indications provided through the display, and responsive to an interaction (e.g., select, click-on, touch, hover), the gaming system 205 can generate an indication identifying a user input and/or selection of a wager, an in-game event, or an indication to participate in a bonus event, among others.

In implementations where the gaming system 205 is a slot machine or other gaming device, the gaming system 205 can include an acceptor device 255. The acceptor device 255 can be any type of device that can accept physical representations of credits, such as a physical token slot, or a physical card reader device. The acceptor device 255 can be positioned in the housing of the gaming device. The acceptor device 255, upon detecting the insertion of a physical representation of one or more credits, can generate a signal for the components of the gaming system 205 to initiate a play of a base game or a bonus game, or to initiate a gaming session. The signal can indicate, for example, a number of credits wagered by a player (e.g., represented by the physical representation of credits input to the acceptor device 255). In some implementations, the acceptor device 255 can provide an identifier of a player profile 270 associated the physical representation of credits (e.g., a physical card corresponding to a player, etc.), which may be used by the gaming system 205 to carry out the operations described herein. The signal from the acceptor device 255 can include an indication to being a play of a base game, such as the slot machine game described herein.

In some implementations, the gaming system 205 may communicate with the client devices 220, which receive input and display various gaming interfaces (e.g., the user interfaces described in connection with FIGS. 3A-3I, etc.), via the network 210. The network 210 can include computer networks such as the Internet, local, wide, metro or other area networks, intranets, satellite networks, other computer networks such as voice or data mobile phone communication networks, and combinations thereof. The gaming system 205 of the system 200 can communicate via the network 210, for instance with one or more client devices 220. The network 210 may be any form of computer network that can relay information between the gaming system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210.

The network 210 may further include any number of hardwired and/or wireless connections. Any or all of the computing devices described herein (e.g., the gaming system 205, the one or more client devices 220, the computer system 100, etc.) may communicate wirelessly (e.g., via WiFi, cellular, radio, etc.) with a transceiver that is hardwired (e.g., via a fiber optic cable, a CAT5 cable, etc.) to other computing devices in the network 210. Any or all of the computing devices described herein (e.g., the gaming system 205, the one or more client devices 220, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

Each of the client devices 220 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 220 can include one or more computing devices or servers that can perform various operations as described herein. The one or more client devices 220 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

Each client device 220 can include, but is not limited to, a personal computer, a laptop computer, a television device, a smart phone device, a mobile device, or another type of computing device. Each client device 220 can be implemented using hardware or a combination of software and hardware. Each client device 220 can include a display or display portion. The display can include a display portion of a television, a display portion of a computing device, a GUI, or another type of interactive display (e.g., a touchscreen, a display, etc.) and one or more I/O devices (e.g., a mouse, a keyboard, digital key pad). The display can include one or more portions, for example, to display user interfaces for a base game or a bonus game, such as the user interfaces described in connection with FIGS. 3A-3I. The display can include a tough screen displaying an application, such as the gaming applications described herein.

The display may include a border region (e.g., side border, top border, bottom border). In some implementations, the display can include a touch screen display, which can receive interactions from a player. The client device 220 may also receive interactions via any other type of I/O device. The interactions can result in interaction data, which can be stored and transmitted by the processing circuitry of the client device 220. The interaction data can include, for example, interaction coordinates, an interaction type (e.g., drag, click, swipe, scroll, tap, etc.), and an indication of an actionable object (e.g., an interactive user interface element, such as a button, hyperlink, etc.) with which the interaction occurred. Each client device 220 can include an input device that couples or communicates with the display of each client device 220 to enable a player to interact with or select one or more actionable objects as described herein. The display can enable interaction with one or more visual indications provided through the display of each client device 220, and responsive to an interaction (e.g., select, click-on, touch, hover), the client device 220 can generate an indication identifying a user input and/or selection of a wager, an in-game event, an indication to initiate a play of a base game, or an indication to initiate a bonus game, or an indication to initiate a gaming session, among others.

Each client device 220 can include or be identified by a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some embodiments, each client device 220 can have a unique device identifier. Each client device 220 can include a client application, which can be a gaming application that communicates with the gaming system 205 to play one or more base games or bonus games, as described herein. The client application can include a user application executing on each client device 220 or provided to the client device 220 by the gaming system 205. The application can include a web application, a server application, a resource, a desktop, or a file.

In some implementations, the application can include a local application (e.g., local to a client device 220), hosted application, a SaaS application, a virtual application, a mobile application, or other forms of content. In some implementations, the application can include or correspond to applications provided by remote servers or third party servers. In some implementations, the application can access the player profiles 270, the play information 275, or the game instructions 280, stored and maintained in the database 215, and generate one or more actionable objects, such as the actionable objects described in connection with FIGS. 3A-3I, to a player through a client device 220. Such actionable objects can be interactive user interface elements such as user-selectable hyperlinks, buttons, graphics, videos, images, or other application features. Interactions with such actionable objects can cause the application executing on the respective client device 220 to generate a signal, which can cause the application to perform further operations corresponding to the actionable object.

In some implementations, one or more client devices 220 can establish one or more communication sessions with the gaming system 205. The one or more communication sessions can each include a channel or connection between the gaming system 205 and the one or more client devices 220. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data, or traffic.

Each of the client devices 220 can be computing devices configured to communicate via the network 210 to access information resources, such as web pages via a web browser, or application resources via the application executing on a client device 220. When accessing information resources, the client device 220 can execute instructions (e.g., embedded in the native applications, in the information resources, etc.) that cause the client devices to display gaming application interfaces, such as the user interface described herein below in conjunction with FIGS. 3A-3I. The gaming application interfaces can be, for example, application interfaces that present different types of casino games, or other types of interactive video games. In general, video games include content (e.g., images, video, animations, graphics, audio, etc.) that is presented to a user via the I/O interfaces of a client device 220. In some implementations, a client device 220 can include an acceptor device 255, which can accept or receive a physical item representative of a currency or credits (e.g., money, a payment card, physical tokens, physical gaming chips, etc.), and generate a signal indicating the number of credits received by the acceptor, as well as a signal to initiate a play of a game. It should be understood that while FIG. 2 depicts a number of client devices 220 in communication with a gaming system 205 over a network, any of the functionalities of the gaming system 205 can be implemented by a client device 220, and vice versa. For example, in some implementations, a client device 220 can itself generate grids of symbols, and calculate corresponding negative and positive bonus accumulators, as described herein.

In response to interactions with corresponding user interface elements, the client devices 220 can transmit information, such as player profile 270 information (e.g., changing player profile 270 parameters, changing login information, etc.), interaction information, selections of wager amounts, selections to initiate a bonus game, or other signals to the gaming system 205. In some implementations, a client device 220 can transmit a request to initiate a gaming session. The request can include, for example, a request to play a particular game (e.g., can include a game identifier, etc.), which can include an indication to participate in a game having a bonus game that utilizes positive and negative bonus accumulators. In some implementations, a client device 220 can transmit, during a play of a game, a signal to the gaming system 205 that indicates a desire to participate in an additional bonus opportunity for that game. The request can be a hypertext transfer protocol (HTTP or HTTPS) request message, a file transfer protocol message, an email message, a text message, or any other type of message that can be transmitted via the network 210.

In general, upon requesting a game, a client device 220 (or an application executing on the client device 220) can receive data relating to the requested game from the gaming system 205. The data relating to the requested game can include indications of a game state, which can be maintained by one or more of the components of the gaming system 205, as described herein. A game state can include one or more data structures that include any information related to a game state, such as a number of plays until a bonus game will be initiated, a number of plays since the last bonus game was initiated, positive accumulator values, negative accumulator values, credit accumulator values, wager information or amounts, previous grids of symbols generated by the gaming system 205 in accordance with the techniques described herein, or other game state data described herein. If the game is a card game, the game state may include the current cards held by a user (e.g., in a blackjack or poker game, etc.). The game state may also include turn information, (e.g., which user has the current turn, how many game turns have elapsed, how many plays of the game has the player initiated, etc.).

In some implementations, the indications of the game state can be received as a play of the game occurs (e.g., as the play is processed by the gaming system 205 according to the game instructions 280, as a new grid of symbols is generated or selected by the gaming system 205, etc.). The indications of the game state can include instructions that cause the client device 220 to display one or more indicia, such as grids of symbols, images, animated graphics, slot machine reels, cards, dice, blackjack tables, poker tables, bingo cards, or other types of gaming indicia or user interface elements. The client devices 220 can receive instructions from the gaming system 205 can cause the client device 220 to display one or more actionable objects, such as the actionable objects described herein below in conjunction with FIGS. 3A-3I.

As described herein, a client device 220 can receive one or more interactions with actionable objects presented on the display of the client device. Interactions can be tap interactions, click interactions, or other types of indications that a user is engaged with a particular user interface element. Upon detecting an interaction with a particular user interface element, the client device 220 can execute instructions (e.g., processor-readable code, a script, etc.) that cause the client device 220 to transmit an appropriate signal to the gaming system 205. A signal can include any information specified by the instructions associated with the particular actionable object with which the user interacted. The signals can include, for example, a request to initiate a play of a game, a request to initiate a bonus game, a request to advance the game state (e.g., wager, spin, stop one or more slot machine reels, hit/stay/split/double-down in blackjack, indications of cards to discard in poker, indications of which dice to roll in a dice game, indications that the user has stopped playing, etc.).

As described herein, a client device 220 and the gaming system 205 can exchange messages containing information that causes an interactive game to be displayed on the display of the client device 220. By interacting with the actionable objects presented on the display of the client device 220, the gaming system 205 can advance the state of the game, and transmit instructions to the client device 220 that cause the client device 220 to change the user interface in accordance with the game state (e.g., display slot machine reels with particular symbols, display one or more reels in a stopped state, display additional cards, display more/fewer dice, display more/fewer actionable objects providing additional functionality, display more/fewer fields that allow the user to enter user information, display game outcomes, display wager amounts, display bonus award opportunity information such as numbers generated by the gaming system 205, etc.). In some implementations, the client device 220 can receive content for presentation on the display of the client device 220 in a streaming arrangement (e.g., content is streamed from the gaming system 205 using a streaming protocol, etc.).

The database 215 can be a computer-readable memory that can store or maintain any of the information described herein. The database 215 can store or maintain one or more data structures, which may contain, index, or otherwise store each of the values, pluralities, sets, variables, vectors, numbers, or thresholds described herein. The database 215 can be accessed using one or more memory addresses, index values, or identifiers of any item, structure, or region maintained in the database 215. The database 215 can be accessed by the components of the gaming system 205, or any other computing device described herein, via the network 210. In some implementations, the database 215 can be internal to the gaming system 205. In some implementations, the database 215 can exist external to the gaming system 205, and may be accessed via the network 210. The database 215 can be distributed across many different computer systems or storage elements, and may be accessed via the network 210 or a suitable computer bus interface. The gaming system 205 can store, in one or more regions of the memory of the gaming system 205, or in the database 215, the results of any or all computations, determinations, selections, identifications, generations, constructions, or calculations in one or more data structures indexed or identified with appropriate values.

Any or all values stored in the database 215 may be accessed by any computing device described herein, such as the gaming system 205, to perform any of the functionalities or functions described herein. In some implementations, a computing device, such as a client device 220, may utilize authentication information (e.g., username, password, email, etc.) to show that the client device 220 is authorized to access requested information in the database 215. The database 215 may include permission settings that indicate which users, devices, or profiles are authorized to access certain information stored in the database 215. The database 215 may be similar to or include the storage 128 described herein above in conjunction with FIG. 1C. In some implementations, instead of being internal to the gaming system 205, the database 215 can form a part of a cloud computing system. In such implementations, the database 215 can be a distributed storage medium in a cloud computing system, and can be accessed by any of the components of the gaming system 205, by the one or more client devices 220 (e.g., via one or more user interfaces, etc.), or any other computing devices described herein.

The database 215 can store one or more player profiles 270 in one or more data structures. Each player profile 270 can be associated with a corresponding player that accesses the functionality of the gaming system 205 using a client device 220. In implementations where the gaming system 205 is itself a complete system that operates without using a client device 220 (e.g., a slot machine, a video game machine, etc.), a player profile 270 may correspond to a player that accesses the gaming system 205 to play games. Each player profile 270 can be a user profile that includes information about a user. Each player profile 270 may include information about one or more of the client devices 220 used to access the gaming system 205 using the player profile 270. For example, identifiers of a player profile 270 can be used to access the functionality of the gaming system 205 via the network 210, or when using the gaming system 205 directly as an integrated gaming device.

The identifiers of player profiles 270 can include a username, a password, an e-mail address, a phone number, a personal identification number (PIN), a secret code-word, device identifiers for use in a two-factor authentication technique, among others. The player profile 270 can store information about historic wagers, historic games, and historic gaming events (e.g., game outcomes, award amounts, in-game events that occurred during a play of a game, player actions taken in response to in-game events, etc.) that are performed using the gaming system 205. The player profile 270 can store a credit balance, wager information (e.g., an amount of a wager, a timestamp associated with a wager, information about the presence of an indication to participate in a bonus opportunity using the wager, a client device identifier of a client device that was used to place the wager, etc.). The player profile 270 can store information about a client device used to access the gaming system 205 such as an internet protocol (IP) address, a media access control (MAC) address, a global unique identification (GUID), a player profile 270 name (e.g., the name of a user of the client device 220, a player-chosen username, etc.), device name, among others. In some implementations, a player profile 270 can be created by the gaming system 205 in response to a player profile 270 creation request transmitted by a client device 220. The player profile 270 creation request can include any of the player profile 270 information described herein. In some implementations, a client device 220 accessing the gaming system 205 may not be associated with a player profile 270. In such implementations, the gaming system 205 can automatically create a player profile 270 using an identifier of the client device 220 provided by the client device 220, for example, in a request to initiate play of a bonus or base game, in a request to initiate a gaming session, or in a request to create a player profile 270.

The database 215 can store or maintain play information 275 associated with each of the one or more player profiles 270. The play information 275 can include game state information for games (e.g., one or more base games, one or more bonus games, etc.) previously or currently played by a client device 220 having a corresponding player profile 270. The game state information can include a game state for a gaming session, which may involve multiple plays of a base game and/or multiple plays of one or more bonus games. A gaming session can be a session in which multiple plays of one or more base games or one or more bonus games may be played, but in which certain values (e.g., positive accumulator values, negative accumulator values, credit accumulator values) persist between plays of such games. A gaming session may be initiated by the gaming system 205, which can allocate corresponding computing resources (e.g., data structures, processor time, etc.) for base games, bonus games, and the game state information. The gaming system 205 can initiate a gaming session for a corresponding player profile 270 in response to a request from a client device 220, in response to a signal generated by an I/O device of the gaming system 205, or in response to a signal generated from the acceptor device 255, among other signals.

The game state information can include accumulator values for the initiated gaming session. When a session is initiated, the gaming system 205 can set default values for accumulator values (e.g., positive accumulator values, negative accumulator values, credit accumulator values, etc.). In some implementations, the default values may be incremented by a predetermined amount based on player input (e.g., an additional wager, or by providing a predetermined number of credits, etc.). The accumulator values may persist for the duration of the gaming session across one or more plays of a base game and/or one or more plays of a bonus game. The gaming system 205 may increment or decrement one or more of the accumulator values as described in further detail herein. For example, a positive accumulator value, as well as negative accumulator values or credit accumulator values, may be increased or decreased according to the game instructions 280 in response to detected in-game events. The detected in-game events may be events that occur in one or more base games or one or more bonus games.

The game state information can include information about a current state of a play of game. In a slot machine game, for example, the game state information may include one or more grids of symbols (e.g., a spin of a slot machine game, etc.), or states of one or more slot machine reels represented as a grid or a portion of a grid of symbols, generated by the gaming system 205 in accordance with the techniques described herein, a number of plays until a bonus game will be initiated, a number of plays since the last bonus game was initiated, positive accumulator values, negative accumulator values, credit accumulator values, wager information or amounts, game outcome information (e.g., a win, a loss, a credit payout amount, any bonus modifier values, etc.), or any other game data described herein. The game state information in the play information 275 can be updated by the gaming system 205 as games are played as part of a gaming session.

The play information 275 can include information about previous wagers, actions, interactions, or other data provided by the client device 220 during a gaming session, a play of a base game, or a play of a bonus game provided by the gaming system 205. The play information 275 can maintain a game state of one or more games or gaming sessions as they are being played. As described herein, the game state can include one or more data structures that include any information related to a game state. For example, such information can include one or more grids of symbols (e.g., a spin of a slot machine game, etc.), or states of one or more slot machine reels represented as a grid or a portion of a grid of symbols, generated by the gaming system 205 in accordance with the techniques described herein, a number of plays until a bonus game will be initiated, a number of plays since the last bonus game was initiated, positive accumulator values, negative accumulator values, credit accumulator values, wager information or amounts, game outcome information (e.g., a win, a loss, a credit payout amount, any bonus modifier values, etc.), card game information such as one or more grids of current cards held by a user (e.g., in a blackjack or poker game, etc.), or other game state data described herein. The game state can include turn information, which may include information about which reels in a slot machine game have been stopped by the user, or turn information for a card or dice game (e.g., which user has the current turn, how many game turns have elapsed, etc.). In some implementations, the indications of the game state can be updated by the gaming system 205 as a play of the game occurs (e.g., as the play is processed by the gaming system 205 according to the game instructions 280, etc.). The game state can include current play options that a player may perform at each portion of a game, and any actions (e.g., interactions, stopping one or more slot machine reels, initiating a bonus game, pausing/waiting for a particular duration at stored timestamps, etc.) the client device 220 takes in response to said play options.

The database 215 can store or maintain game instructions 280. The game instructions 280 can include instructions to play any type of base game (e.g., a slot machine game, a card game such as blackjack, poker, or rummy, a dice game such as craps, sic bo, or Klondike, or any other game, etc.). The game instructions 280 can include one or more gameplay options that are available to a player at a particular game state, and outcomes that would result from a player engaging in said gameplay options. In short, the game instructions 280 can include instructions to play a game from start to finish, by streaming gaming content to each of the client devices 220 that initiate play of a particular game or a game session, and by receiving input from a client device 220 to advance a game state. Generally, the gaming system 205 can maintain one game state for each client device 220 (or each player profile 270) accessing the functionality of the gaming system 205. The game instructions 280 can be stored in one or more data structures that are indexed by a game name (e.g., slot machine game, bonus games, blackjack, poker, rummy, craps, sic bo, Klondike, any other game, etc.). The game instructions 280 can be or may include processor executable or interpretable instructions that cause the gaming system 205 to provide one or more games to a client device 220 via a communication session, or to advance a game state of a gaming session, as described herein. In some implementations, the gaming instructions 280 can include artificial intelligence models (e.g., machine learning models, neural network, decision trees, rule-based lookup table, etc.) that cause the gaming system 205 to play an opposing entity to a user of one of the games in the game instructions 280. For example, the artificial intelligence model can provide a simulated dealer in a blackjack game, a simulated user in a poker game, or other simulated users, dealers, or game entities. In some implementations, the opposing entity may be implemented using a predetermined rule-based model.

The game instructions 280 can include odds information, which can be stored as probability values of certain in-game events occurring. For example, in a slot machine game, the odds information can correspond to a probability that a particular symbol will appear in a grid of symbols generated by the gaming system 205. The odds information may also include pay table information, which may indicate a respective credit award (or an award multiplier of an input credit wager) that will be provided to a player in response to one or more predetermined arrangements of symbols being generated (e.g., being present in a grid in a predetermined order or arrangement, being present in the grid in a predetermined order or arrangement and intersecting with one or more pay lines, etc.). In some implementations, the odds information can be altered based on actions taken by the user, or the odds information can effectuate a particular expected outcome (e.g., an expected value of user loss, an expected value of user win, etc.). The game instructions 280 can cause the game state in the play information 275 to be updated as a game is played by a client device 220. The game instructions 280 may also include instructions to carry out or otherwise execute one or more bonus games, such as the bonus games described in further detail herein. The gaming system 205 may utilize information from the play information 275, such as the positive accumulator values, the negative accumulator values, or the credit accumulator values, to carry out or otherwise execute the game instructions 280 for one or more bonus games. The game instructions 280 can specify the conditions under which a player can be awarded with bonus award amounts (e.g., at game termination, on a bonus win condition, on a bonus loss condition, etc.). Each of the components of the gaming system 205 can access, update, or modify the player profiles 270, the play information 275, or the game instructions 280, to carry out functionalities described herein.

Referring now to the operations of the gaming system 205, the game initiator 230 can receive an indication of a wager on a play of a game. The indication can be transmitted by one or more of the client devices 220, and can include an indication of a player profile 270 with which to use for the functionalities related to the game (e.g., placing wagers using earned credits, purchasing additional credits, etc.). In some implementations, the indication can be a signal received from the acceptor device 255. In such implementations, the signal may identify an amount of a wager, an identifier of a player profile 270 corresponding to the player that initiates the play of the game, an identifier of a base game to play as part of a gaming session, or combinations thereof. The indication can be a request to play a game, and can include an identifier of a particular game to play. The indication may be a request to initiate a gaming session for a particular game (e.g., the slot machine game depicted in FIGS. 3A-3I, etc.). The gaming session may involve multiple plays with play information 275 (e.g., the positive accumulator values, the negative accumulator values, the credit accumulator values, other game state information, etc.) that persists between plays. In some implementations, the game initiator 230 can provide the client device 220 with instructions to display one or more games to play, allowing the user to select a game from the list. In response to an interaction indicating a selection, the client device 220 can transmit a signal identifying a game. Using the game selection, the game initiator 230 can communicate a second user interface (e.g., similar to the user interface depicted in FIG. 3A, etc.) that prompts the user to select a wager amount.

The selected game can be, for example, a slot machine game, such as the slot machine game described in connection with FIGS. 3A-3I. A slot machine game can include providing one or spins (or virtual spins) of one or more reels of symbols in response to a wager of a number of credits. In response to initiating a play of the slot machine game, the components of the gaming system 205 can generate one or more grids of symbols, which collectively correspond to the stopped reels of the slot machine. Upon receiving a request to initiate a game session or to initiate a play of the game, the game initiator 230 can initiate or allocate computing resources to carry out the gaming session (or play of the game) according to the game instructions 280 for the selected game (e.g., a slot machine game, etc.).

For example, to initiate a gaming session, the game initiator 230 may reset or allocate resources for play information 275 for a new game session for the requesting player profile 270. Allocating resources can include initiating a positive accumulator value, a negative accumulator value, and a credit accumulator value to default predetermined values. In addition, the game initiator 230 can initiate various counters relating to the game session to predetermined values. For example, the game initiator 230 may set a counter for a number of credits wagered by the player during the game session to zero, a counter for a number of plays of the game since the last bonus game to zero, and any other counter described herein to zero. A play of a game can be a single "round" or play-through of a game to a termination condition (e.g., a condition after which the user has won or lost the wager, etc.). For example, a play of a slot machine game may be a spin that rotates all of the reels of the slot machine until each reel has stopped and a payout amount has been determined. The termination condition for the slot machine game in this example would be when all spinning reels of the slot machine game have stopped. A gaming session may include multiple plays of the game, such that the positive and negative accumulator values persist between plays. To initiate a play of the game, the game initiator 230 can generate a signal for the grid generator.

Once the game has been selected and the game session has been initiated, the game initiator 230 can provide a user interface (e.g., similar to the user interface depicted in FIG. 3A, etc.) that prompts the player to provide a wager amount (if not already provided via the acceptor device 255), and initiate a play of the game. The wager amount can be a specified amount of credits, such as 1, 5, 25, 100, 500, or 1000 credits. In some implementations, the player can specify the number of credits used in the game (e.g., via one or more user interface elements, etc.) via the user interface. Once the wager is selected using the user interface, the client device 220 can transmit a request to place the wager for the play of the game. An example of a user interface that allows a user to place a wager for a slot machine game is described herein below in conjunction with FIG. 3A.

Figure 3A:
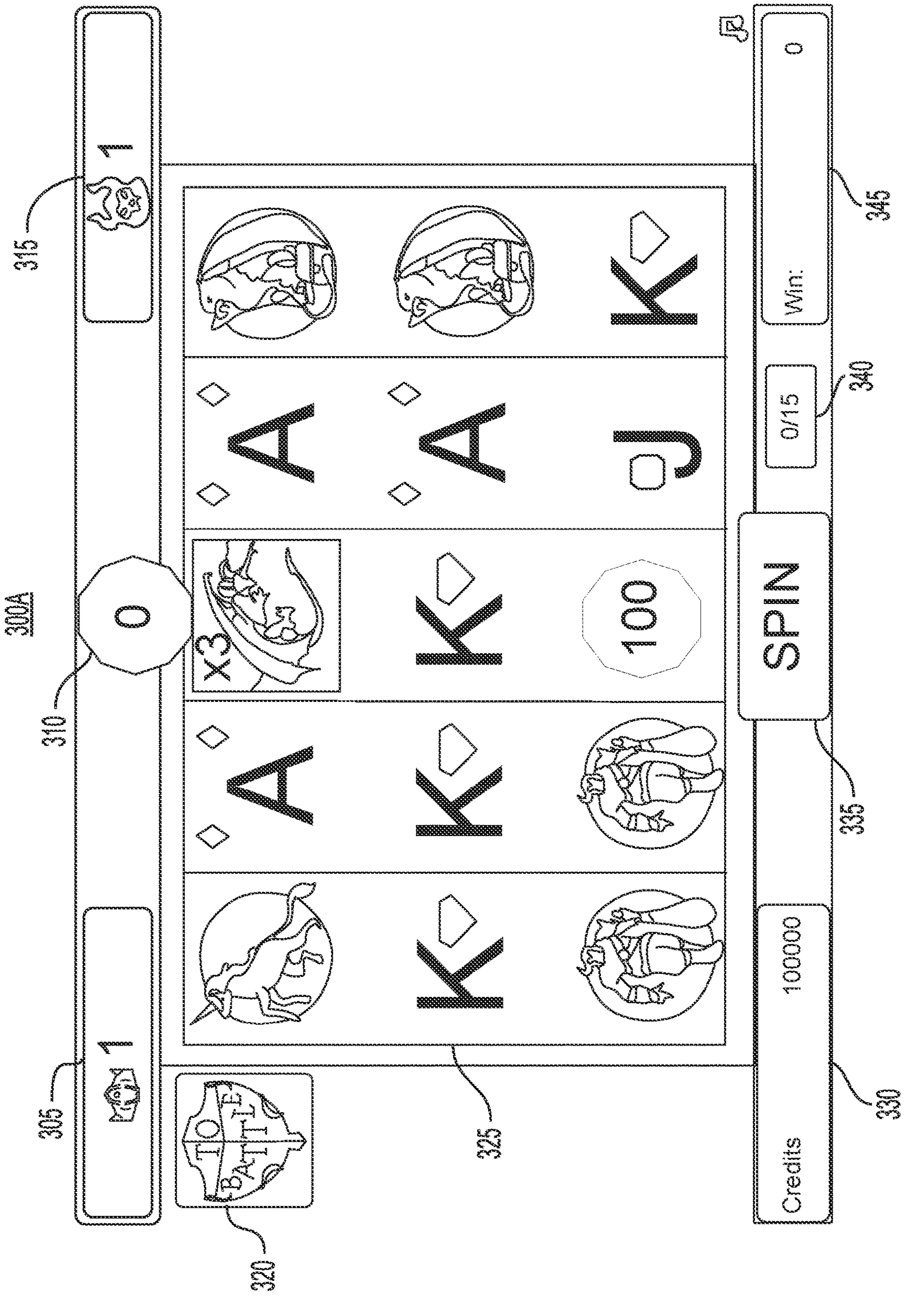
FIGS. 3A, 3B, 3C, 3D, 3E, 3F, 3G, 3H, and 3I illustrate example user interfaces that display information from the interactive system described in connection with FIG. 2, in accordance with one or more implementations.

Referring briefly now to FIG. 3A, depicted is an example gaming interface 300A that can be displayed on a client device, such as the client device 220, or another computing device described herein. As shown in FIG. 3A, the gaming interface 300A is an interface for a slot machine game. The slot machine game can be a base game, with various conditions (e.g., symbols that appear on slot machine reels, etc.) that can cause positive accumulator values 305 and negative accumulator values 315 to increment. As shown, the gaming interface 300A can include wagering interactive objects, such as the spin button 335, which when actuated causes the gaming system 205 (e.g., in response to a corresponding signal transmitted by the client device 220) to initiate a play of the slot machine game. In addition, the total number of credits held by the player (e.g., as indicated in the corresponding player profile 270, etc.) are shown in the credits interface 330. When an outcome of the slot machine game is determined (e.g., based on the arrangement of symbols displayed on the reels 325 after the reels 325 have been stopped, etc.), the amount won is displayed in the outcome interface 345 (shown as the "Win:" user interface element).

As shown, each of the reels 325 can include a number of symbols, one or more of which may be associated with one or more of a positive increment value (e.g., an amount by which to increment the positive accumulator value 305), a negative increment value (e.g., an amount by which to increment the negative accumulator value 315), or a credit increment value (e.g., an amount by which to increment the credit accumulator value 310). In addition, other symbols may correspond to various payouts for the base slot machine game. Shown here, such symbols include symbols of unicorns, eagles, and card symbols such as king, jack, and ace. However, it should be understood that any type of symbols or indicia may be provided for the slot machine symbols. Payouts (e.g., a win amount, etc.) may be determined according to predetermined rules in the game instructions 280, which may designate various arrangements, pay lines, or symbol types that correspond to predetermined payouts or payouts that are functions of an input wager amount.

In some implementations, the input wager amount may be predetermined for each play of the slot machine game. In some implementations, one or more symbols may correspond to multiplier values (shown here as a "x3" multiplier with a corresponding symbol), which may multiply a payout or a portion of a payout according to one or more pay tables in the game instructions 280. After accumulating the positive and negative accumulator values 305 and 315, respectively, the player may interact with the bonus game button 320 (shown here as the "To Battle" button). Interactions with the bonus game button 320 can cause the client device 220 to transmit a request to initiate a bonus game, which may include a second set of user interfaces such as those described in connection with FIGS. 3G-3I.

The bonus game may also be automatically initiated in response to one or more conditions, such as a number of plays of the slot machine game being equal to, or exceeding, a predetermined value. In some implementations, the bonus game may be initiated in response to another type of condition being met, such as an accumulator value (e.g., the credit accumulator value, the positive accumulator value, or the negative accumulator value) being equal to, or exceeding, a predetermined threshold value. As shown in the game counter 340, when the game session is first initiated, zero games have been played. In this example, the number of games played before the bonus game initiates (regardless of the values of the positive accumulator 305, the negative accumulator 315, or the credit accumulator 310) is fifteen. This provides additional strategy considerations to the player when determining whether to manually initiate the play of the bonus game prior to the number of plays of the game reaching (or exceeding) the predetermined value.

Referring back to FIG. 2, upon receiving player input to initiate a play of the game (e.g., via a user interface element such as the spin button 335 described in connection with FIG. 3A), the game initiator 230 can decrease a credit balance based on the wager (or a predetermined wager amount indicated in the game instructions 280). Decreasing the credit balance can include subtracting the wager amount from the total credits available to the player profile 270. If the wager amount exceeds the total credits available, the game initiator 230 can prompt the user to access more credits (e.g., via purchase, coupons, or using one or more codes that unlock credits, etc.). In some implementations, the game can implement a free-play mode, in which the user has unlimited credits (or can replenish the total credit amount indefinitely, etc.). The game initiator 230 can compare the wager amount to the credit balance of the player profile 270 to determine whether the wager amount exceeds the credit balance. If the credit balance is not exceeded, the game initiator 230 can cause the game to commence (e.g., set the game state in the play information 275 to an initial state, etc.).

Upon receiving or detecting the indication to begin the play of the game, the grid generator 235 can generate, responsive to receiving the indication to begin the play of the game, a grid of one or more symbols, such as the symbols on the reels described in connection with FIGS. 3A-3F. As described herein, a play of the game can be a spin of a slot machine, which may have one or more reels. Generating the grid of symbols can include selecting a respective set of symbols for each reel of the slot machine. Each set of symbols can be selected based on one or more selection rules in the game instructions. For example, each of the symbols may have a predetermined probability of appearing on at least one real. For each symbol, the grid generator 235 can generate a random number, and if the random number appears falls within a numerical range predetermined for a particular symbol (e.g., predetermined based on a desired probability distribution), the symbol can be selected for inclusion in the reel. In some implementations, the symbols for each reel may be predetermined, but the order in which the symbols appear on each reel may be randomized using a random number generator.

The number of reels for the slot machine may be predetermined, or may be selected by a player when initiating a gaming session or a play of the game. The grid generator 235 can generate display instructions for the client device 220 (or for a display device of the gaming system 205) to display each of the selected sets of symbols on the reels. The display instructions can show each of the reels, and the symbols thereon, rotating at predetermined rates. The display instructions may include one or more graphics for each of the symbols, or identifiers of graphics, as well as information indicating a location on each reel that the symbol is located. In some implementations, the rotation of each of the symbols can be streamed to the client device 220, for example, as part of a video stream. In some implementations, the rotation of the reels of symbols may be performed at the client device 220. The player can have an opportunity to stop each reel via an interaction with one or more user interface elements displayed at the client device 220 (e.g., interacting with a spinning wheel may stop the reel, interacting with the interface as a whole may stop a reel, interacting with a button displayed at the client device 220 may stop a reel, etc.).

Upon receiving an interaction to stop a reel, the grid generator 235 can generate a portion of the grid of symbols. In some implementations, the grid generator 235 can select a random subset of the symbols displayed on the reel to be stopped, and can display (or generate display instructions for the client device 220 to display) the reel in a stationary position showing the subset of the symbols. In some implementations, the subset of the symbols can be selected based on the position of the reel at the time the reel is stopped. For example, the grid generator 235 may receive, or otherwise determine, a position of the reel at the time of the interaction. The grid generator 235 can select the symbols that were displayed to the player at the time of the interaction as the subset of symbols for that reel. In some implementations, the subset of symbols may include a predetermined number of symbols. If more than the predetermined number of symbols were displayed to the player at the time of the interaction, the grid generator 235 can perform a tie breaking policy between the displayed symbols to select the predetermined number of symbols for the subset. Once selected, the subset of symbols can be displayed to the player on the reel, and the reel can be displayed as a stationary reel. An example of stopped reels in a slot machine game is shown in FIG. 3B.

Figure 3B:
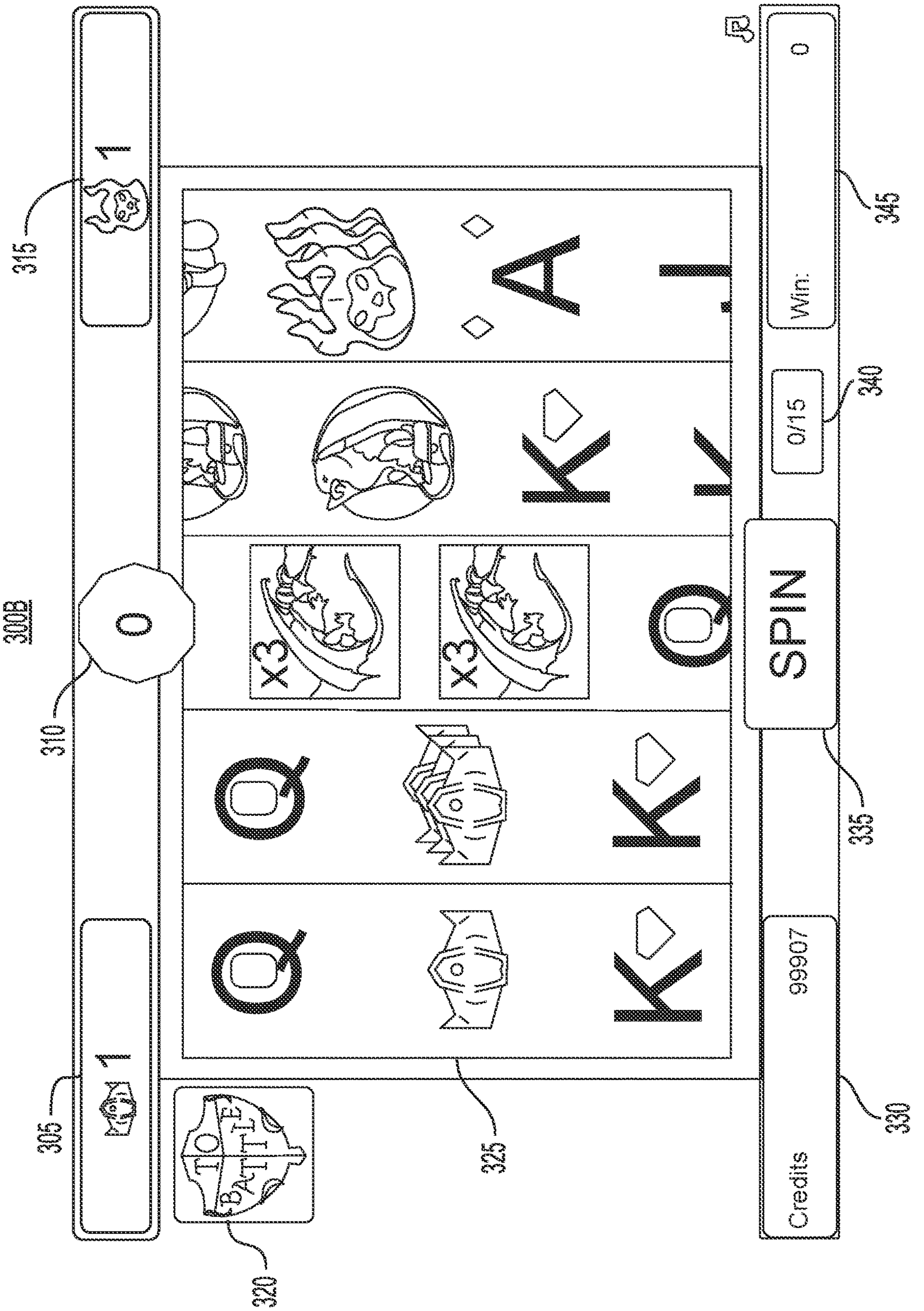

Referring briefly now to FIG. 3B, depicted is an example gaming interface 300B that can be displayed on a client device 220, such as the client device 220, or another computing device described herein. As shown in FIG. 3B, the gaming interface 300B is an interface for the slot machine game shown in FIG. 3A. At this stage, the player has initiated a play of the game, and the reels have begun to spin. Some of the reels are displayed as stopped in response to user input. The first two reels 325 (from left to right) in a stopped position, while the other three reels 325 remain spinning. At this stage, the grid generator 235 has generated two portions of the final grid of symbols. The player can provide additional interactions until each of the reels 325 are stopped. In some implementations, each reel stops after a predetermined amount of time, and therefore do not require player input to stop. After each of the reels are stopped, an interface similar to that shown in FIG. 3C can be displayed.

Figure 3C:
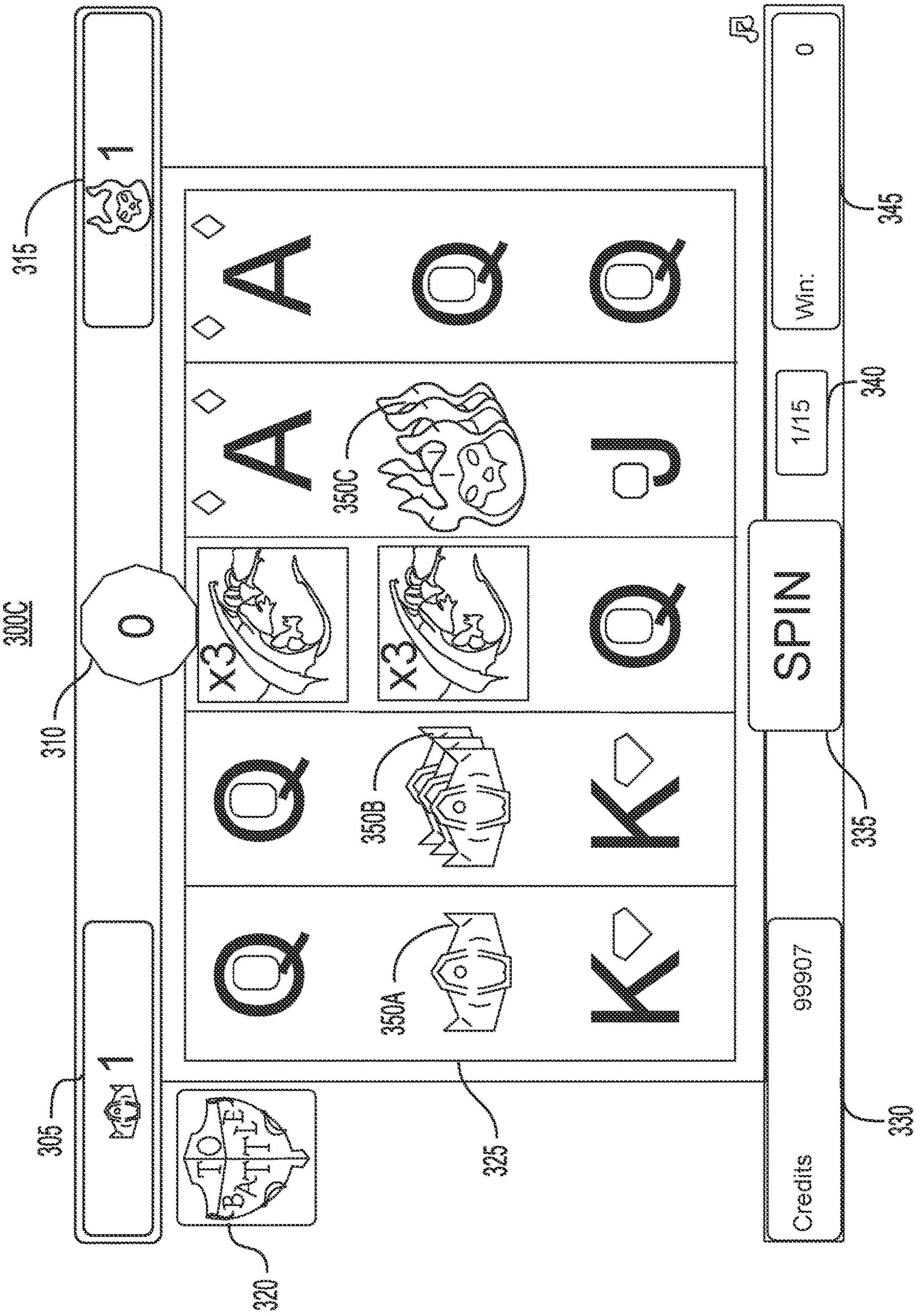

Referring briefly now to FIG. 3C, depicted is an example gaming interface 300C that can be displayed on a client device 220, such as the client device 220, or another computing device described herein. As shown in FIG. 3C, the gaming interface 300C is an interface for the slot machine game shown in FIG. 3A. At this stage, the slot machine game has reached a termination condition because all of the reels have stopped. The symbols 350A, 350B, and 350C can correspond to symbols with attributes that indicate an amount by which to increment the positive accumulator value 305 or the negative accumulator value 315. In this example, the symbol 350A indicates that the positive accumulator value 305 should be incremented by one, because the symbol includes one crown. The symbol 350B indicates that the positive accumulator value 305 should be incremented by three, because the symbol includes three crowns. The symbol 350C indicates that the negative accumulator value 315 should be incremented by three, because three skulls are presented. It should be understood that other increment values other than one and three are possible, and that the crown and skull symbols are used purely for example purposes, and that any appropriate symbol can be used. The attributes of the symbols may be stored as part of the game instructions 280 for the slot machine game.

Referring back to FIG. 2, the grid generator 235 can complete generation of the grid of symbols after each of the reels has been stopped, either via player input or based on a predetermined time period expiring. The grid of symbols includes each of the symbols displayed on each stopped reel. In some implementations, the grid generator 235 can generate the grid of symbols via random selection (e.g., using a random number generator to select the symbols according to probability values assigned to each symbol, etc.) prior to the reels being stopped (e.g., either by a player or otherwise). The reels, when stopped, can then display the respective portion of the grid of symbols corresponding to that reel. The grid of symbols is comprised of the symbols on each reel, when stopped, and therefore determines the outcome of the play of the game.

The credit adjuster 250 can determine an award amount based on the symbols in the grid of symbols. The credit adjuster 250 can adjust the credit balance based on an arrangement of the at least one symbol in the grid. The credit adjuster 250 can determine an award amount based on the game instructions 280. For example, a pay table in the game instructions 280 can indicate which symbols, if present in the grid of symbols, cause the award amount to be incremented, and the amount that each symbol increments the award amount. In some implementations, the credit adjuster 250 can adjust the credit balance based on an arrangement of the symbols in the grid of symbols. For example, the pay table in the game instructions can indicate one or more predetermined arrangements of symbols that correspond to predetermined award amounts. The credit adjuster 250 can compare the grid of symbols to each entry in the pay table, accumulating each award amount corresponding to that entry upon detecting a match. Once each entry has been compared to the grid of symbols, the credit adjuster 250 can adjust the credit balance for the player in the corresponding player profile 270 by the accumulated award amount. The credit adjuster 250 may also increment one or more values corresponding to the play of the game, such as the counter indicating the number of plays that have been completed since the last bonus game. Then, the game initiator 230 may receive further player input that includes a request to initiate another play of the game, and the grid generator 235 can generate a second grid of symbols using the techniques described herein.

The accumulator calculator 240 can calculate a positive accumulator value, a negative accumulator value, and a credit accumulator value based on attributes of each symbol of the grid of symbols. In addition to calculating the total award amount for the slot machine outcome (e.g., the grid of symbols), the accumulator calculator 240 can increment one or more values corresponding to the game state of the game session, such as the positive accumulator value, the negative accumulator value, and the credit accumulator value. As described herein, some of the symbols in the grid of symbols may be associated with an attribute that indicates an amount by which to increment a particular accumulator (e.g., positive, negative, credit, etc.). The accumulator calculator 240 can iterate through each symbol in the grid of symbols, and access any attributes associated with that symbol (e.g., as indicated in the game instructions 280, etc.).

The grid of symbols may be represented as a list of identifiers, where each position in the list corresponds to a respective position in the grid of symbols, and the entry at each position in the list includes a respective identifier of the symbol at that position. The accumulator calculator 240 can iterate through the list, and compare each identifier to a corresponding accumulator table stored in the game instructions 280. The accumulator table may be similar to a pay table, and can map identifiers of symbols to respective amounts to increment one or more of the accumulator values (e.g., the positive accumulator value, the negative accumulator value, or the credit accumulator value). The accumulator calculator 240 can scan through the list and accumulate each of the positive accumulator value, the negative accumulator value, and the credit accumulator value, by the amount indicated in the accumulator table for each symbol in the grid of symbols. In some implementations, the accumulator calculator 240 can calculate the positive accumulator value, the negative accumulator value, or the credit accumulator value at least in part based on an arrangement of the symbols in the grid. For example, the accumulator table may indicate corresponding groupings of particular symbols (e.g., two or more predetermined symbols adjacent to one another in the grid, etc.) that increment certain accumulators by predetermined amounts. The accumulator calculator 240 can then transmit the updated positive accumulator value, the negative accumulator value, and the credit accumulator value to the client device 220 for display (or can display those values on a display of the gaming system 205). An example interface showing these values being updated is shown in FIG. 3D.

Figure 3D:
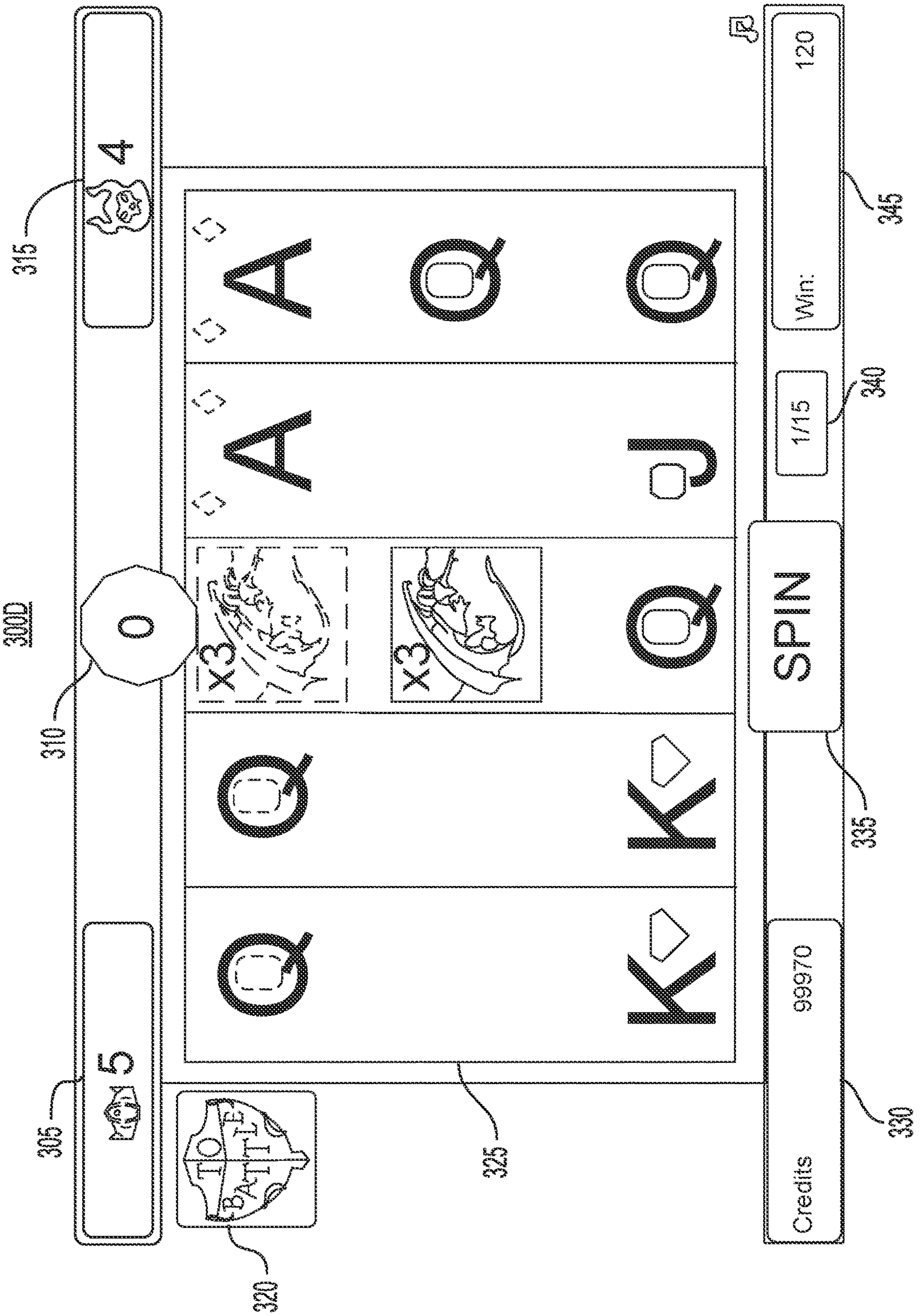

Referring briefly now to FIG. 3D, depicted is an example gaming interface 300D that can be displayed on a client device 220, such as the client device 220, or another computing device described herein. As shown in FIG. 3D, the gaming interface 300D shows the gaming interface of FIG. 3C after the positive accumulator value 305 and the negative accumulator value 315 have been calculated. Recall that in FIG. 3C, the symbol 350A indicated that the positive accumulator value 305 should be incremented by one, because the symbol includes one crown, the symbol 350B indicated that the positive accumulator value 305 should be incremented by three, because the symbol includes three crowns, and the symbol 350C indicated that the negative accumulator value 315 should be incremented by three, because three skulls are presented.

The interface 300D shows that the positive accumulator value 305 has been incremented by four (with its previous value being one), such that it is now equal to five. Likewise, the negative accumulator value 315 has been incremented by three (with its previous value being one), such that it is now equal to four. In some implementations, and as shown here, the symbols 350A, 350B, and 350C that cause the positive accumulator value 305 and the negative accumulator value 315 to increase can be made invisible (e.g., accompanied by a corresponding fade out animation). Additionally, the award interface 345 shows that the amount won is 120 credits, which is the award amount calculated by the credit adjuster 250 based on the symbols in the grid. The counter interface 340 that tracks the number of games played since the last bonus game has also incremented by one, indicating that the play of the game has completed.

Figure 3E:
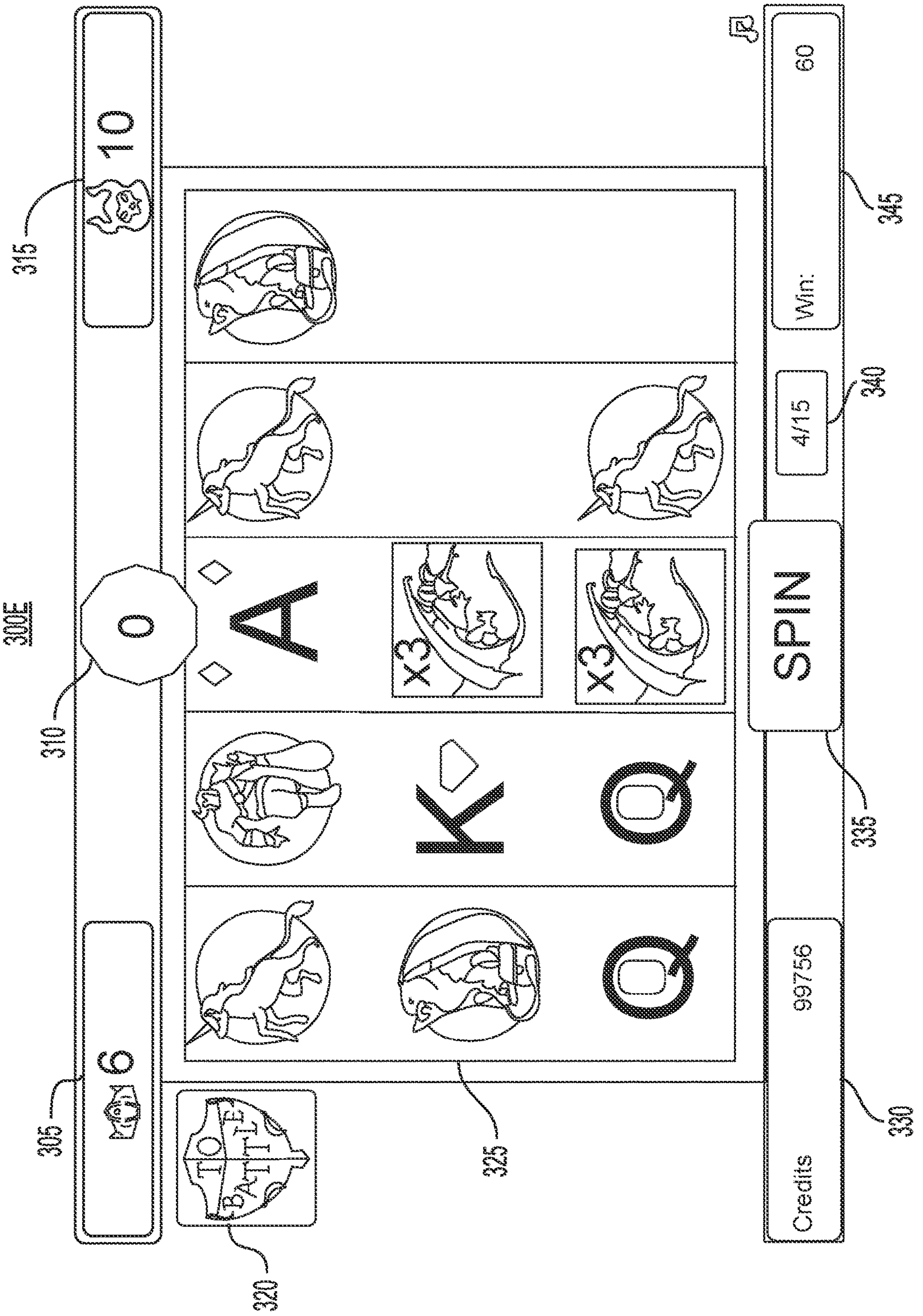

Referring to FIG. 3E, illustrated is an interface 300E that is similar to the interface 300D shown in FIG. 3D. The interface 300E shows the slot machine game after a fourth play has been completed (e.g., as indicated at the counter interface 340). As shown, the positive accumulator value 305, the negative accumulator value 315, and the credit accumulator value 310 persist (and can continue to increase) across plays of the slot machine game. After this play, the positive accumulator value 305 is equal to six, the negative accumulator value 315 is equal to ten, and the credit accumulator value 310 is still equal to zero. Three symbols in the grid are shown as removed, indicating that they corresponded to symbols that increased one or more of the accumulator values. However, in some implementations, such symbols may not be removed from the grid.

Figure 3F:
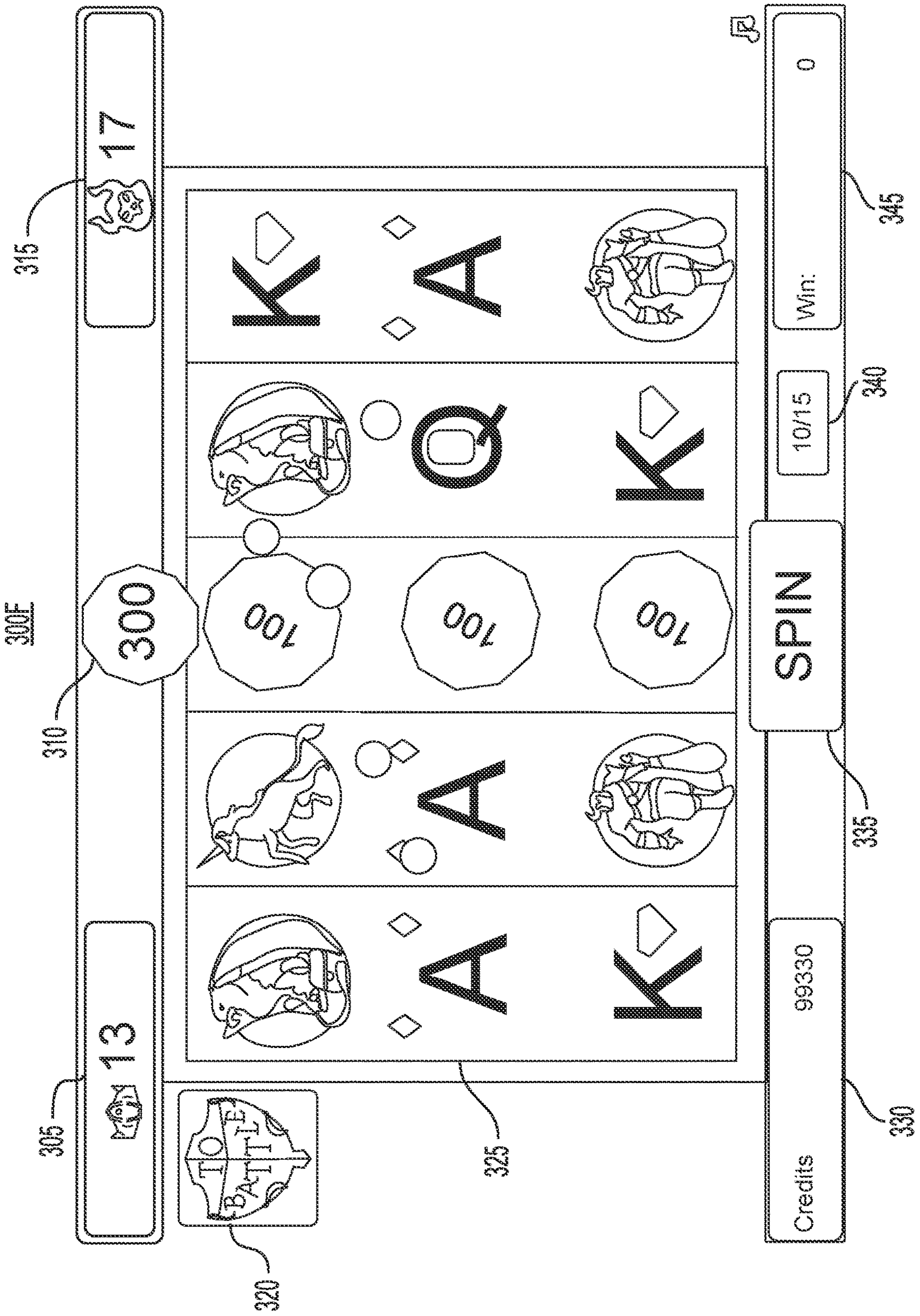

FIG. 3F shows another interface 300F following the tenth play of the game in the gaming session. As shown in the interface 300F, the positive accumulator value 305 is now equal to thirteen, and the negative accumulator value 315 is now equal to seventeen. As shown, three symbols that each have attributes that indicate 100 will be added to the credit accumulator value 310 are presented in the grid of symbols. As a result, the credit accumulator value 310 has been incremented to 300. Although the credit accumulator symbols are shown in a row, it should be understood that any arrangement of symbols may cause the credit accumulator value 310 to increase according to the symbol attributes (e.g., based on the accumulator table in the game instructions 280).

Referring back to FIG. 2, the bonus game executor 245 can detect player input to initiate a bonus game. In some implementations, the player input can be detected via a physical input device of the gaming system 205, such as a touch screen or a physical button on the housing of the gaming system. As described herein, the gaming system 205 can receive player input to initiate the bonus game. The player input may be an interaction with a user interface element (e.g., the "To Battle" button 320 shown in FIGS. 3A-3F). In some implementations, the bonus game may be initiated in response to one or more in game events, such as a certain symbol appearing in the grid of symbols, or an arrangement of symbols (e.g., a row of predetermined symbols corresponding to the bonus game, etc.) appearing in the grid of symbols. In some implementations, the bonus game may be initiated in response to a condition of the game session. For example, the bonus game executor 245 can initiate the bonus game in response to detecting that the number of plays of the game during the game session since the last bonus game was played is equal to, or exceeds, a predetermined threshold. In the example in FIGS. 3A-3F, the threshold is shown as fifteen. When fifteen games have completed, the bonus game executor 245 can initiate the bonus game based on the positive accumulator value and the negative accumulator value. Providing the opportunity to manually initiate the bonus game provides additional strategy considerations to the player, because the player must consider whether to manually initiate the play of the bonus game prior to the number of plays of the game reaching (or exceeding) the predetermined value. These considerations may be based on the overall difference between the positive accumulator value and the negative accumulator value. This allows the player the opportunity to weigh a potential increase of the positive accumulator value over the negative accumulator value, versus the chance that the negative accumulator value may increase and reduce the difference between the two, or potentially exceed the positive accumulator value. The automatic initiation of the bonus game after a predetermined number of plays provides an additional strategy consideration.

The bonus game executor 245 can execute, responsive to determining that the bonus game should be initiated, the bonus game based on the positive accumulator value and the negative accumulator value. The bonus game can be a game that is separate from the base game (e.g., in the case of FIGS. 3A-3F, a slot machine game). The instructions for the bonus game may be stored as part of the game instructions 280. Generally, the bonus game can be any type of game that utilizes the positive accumulator value and the negative accumulator value to provide an additional award opportunity for the player. The bonus game may be a chance based game (e.g., with an outcome determined based on one or more randomly generated values), or a skill based game (e.g., where the player can provide input at predetermined times to win a bonus award amount, or a game in which the outcome is determined by a player's physical skill, such as fast reaction time or dexterity, etc.). To execute the bonus game, the bonus game executor 245 can execute instructions for the bonus game 245 in the game instructions 280. The bonus game executor 245 can store or maintain all of the variables, counters, or other information for the bonus game as part of the game state data in the play information 275. When executing the bonus game, the bonus game executor 245 can replace the grid of symbols with a bonus game interface. The bonus game executor 245 can generate display instructions to display the bonus game at a client device 220, or at a display of the gaming system 205. An example of a bonus game executed by the bonus game executor 245, and the interfaces thereof, is shown in FIGS. 3G-3I.

Figure 3G:
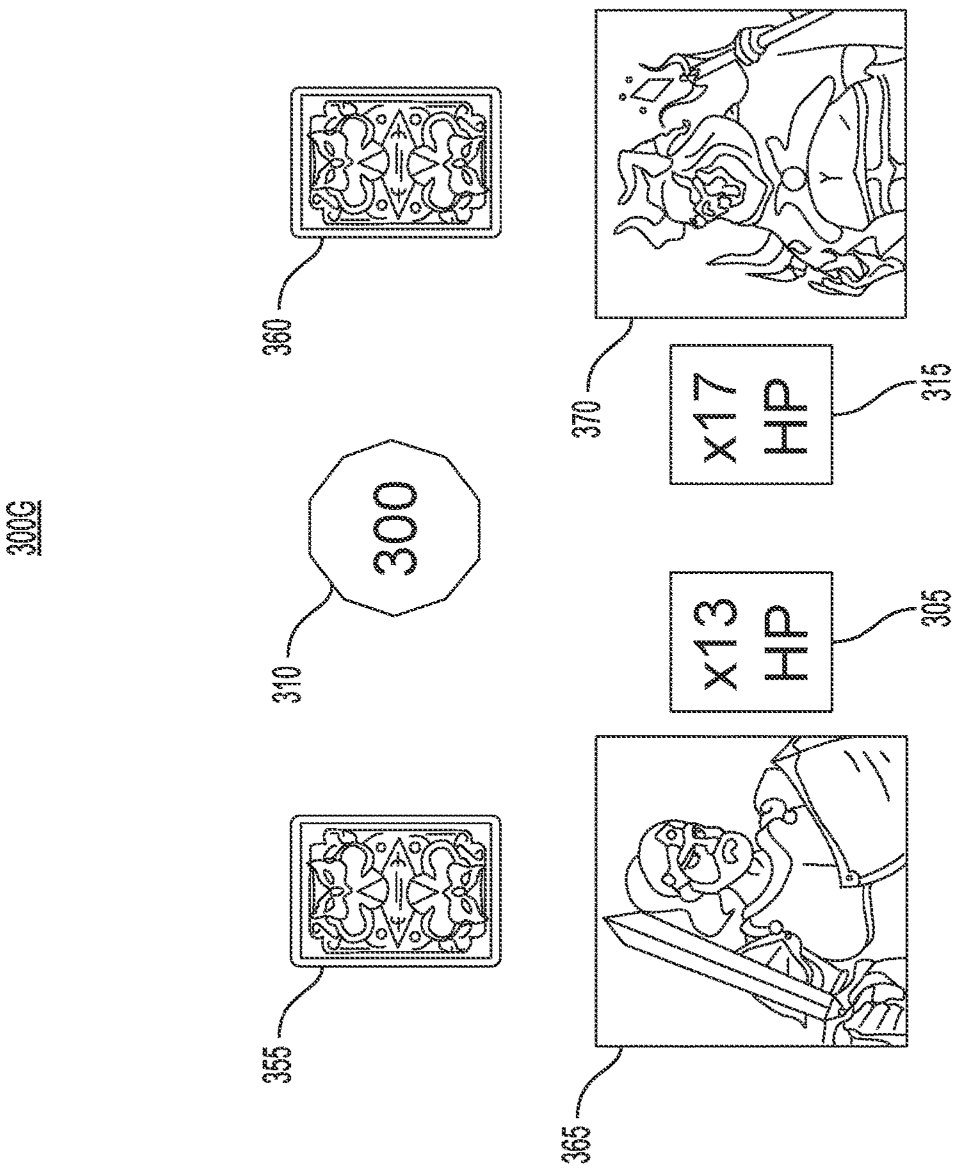

Referring to FIG. 3G and others, illustrated is an example bonus game interface 300G. For the purposes of this example, the bonus game will have initiated following the interface 300F shown in FIG. 3F (e.g., in response to user input with the "To Battle" button 320). The bonus game interface 300G shows the credit accumulator value 310 at the top middle of the interface, which indicates the amount of credits that the player can win if the bonus game ends favorably. In this example, the bonus game executed by the bonus game executor 245 is a chance-based bonus game, which depends in part on the positive accumulator value 305 and the negative accumulator value 315. As shown, the positive accumulator value 305 represents the health points (shown as "HP") of the player character, shown as the knight 365. The negative accumulator value 315 represents the HP of the opposing enemy character, represented by the lich 370. In this bonus game, the cards 355 and 360 start face down, and will be flipped to reveal respective values for the player character and the enemy character. The values on each card 355 and 360 can be randomly generated by the bonus game executor 245. Note that prior to revealing the cards for the player character and the enemy character, the HP of the player (the positive accumulator value 305) is equal to thirteen, and the HP of the enemy (the negative accumulator value 315) is equal to 17. An example interface of the next stage in the bonus game, in which the values on each of the cards 355 and 360 are revealed, is shown in FIG. 3H.

Figure 3H:
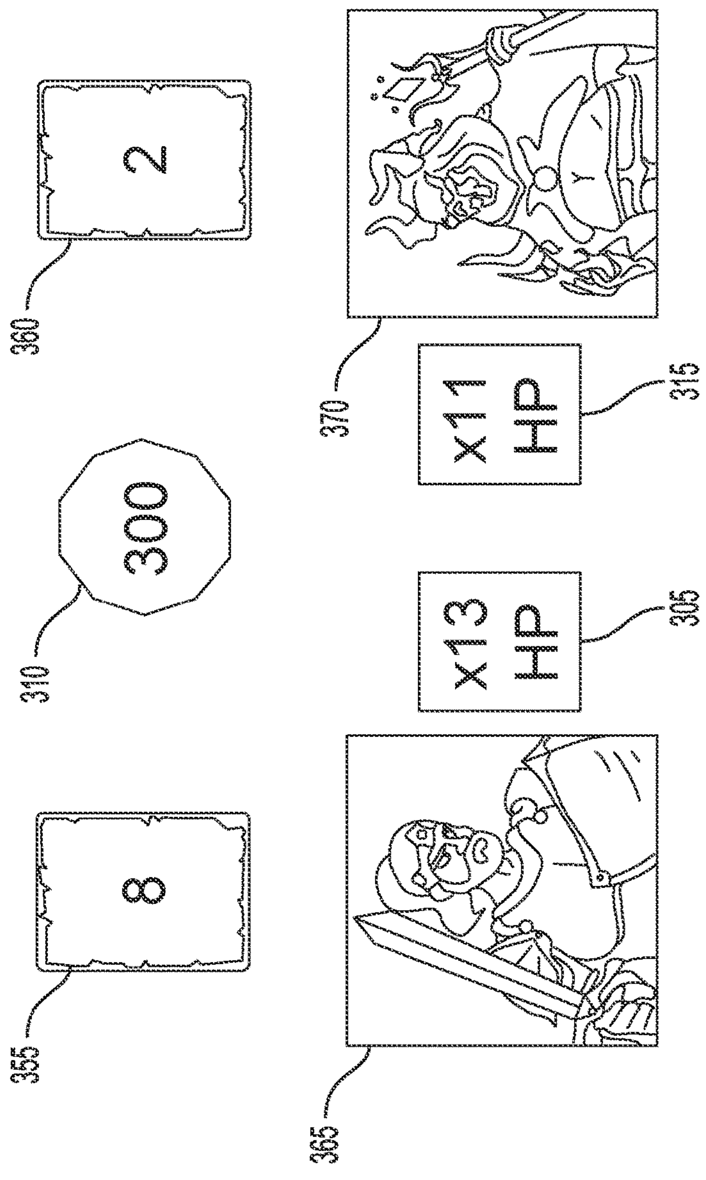
Figure 3I:
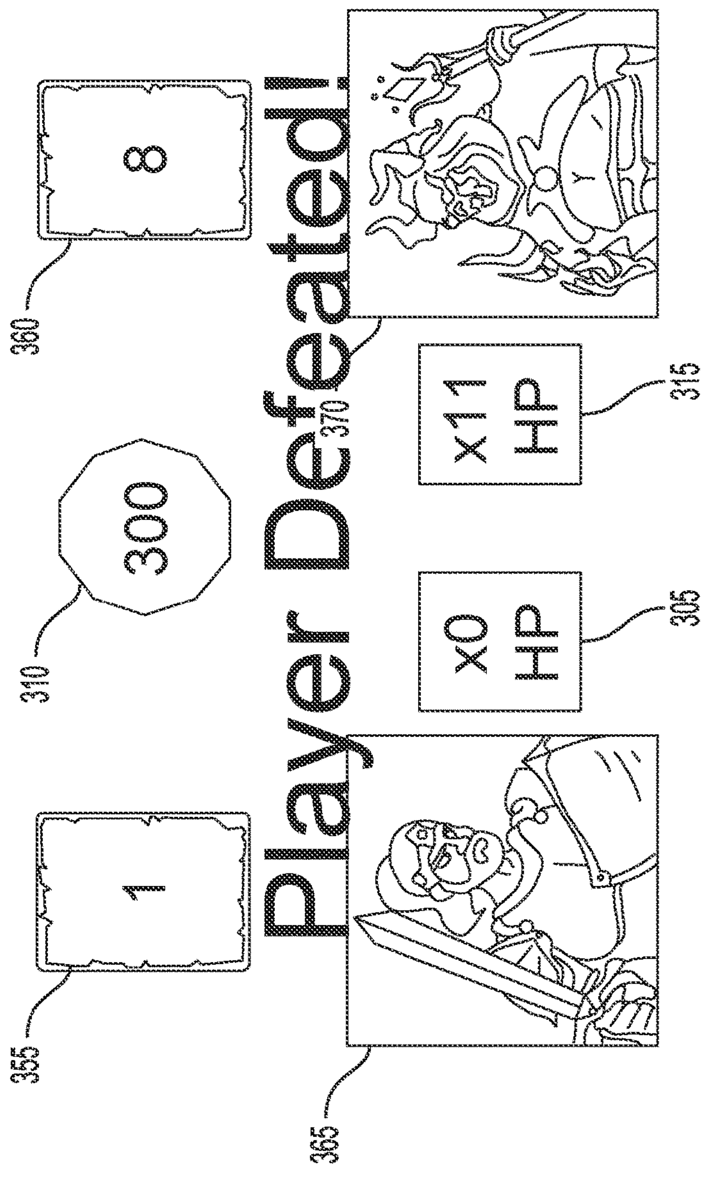

Referring to FIG. 3H and others, illustrated is an example bonus game interface 300H of the next stage in the bonus game. After initiating the bonus game and displaying the positive accumulator value 305, the negative accumulator value 315, and the credit accumulator value 310 to the player, as shown in FIG. 3G, the bonus game moves to the next stage shown in FIG. 3H, in which the cards 355 and 360 have been flipped to reveal values randomly generated by the bonus game executor 245. The bonus game executor 245 may randomly generate the values based on information in the game instructions 280, which may indicate ranges of random values to generate (e.g., one to ten, one to twenty, etc.). When the randomly generated values on the cards are revealed, an amount to subtract from the positive accumulator value or the negative accumulator value is determined. To determine the amount to subtract, the bonus game executor 245 can subtract the smallest of the two random values from the largest of the two random values. In this example, the largest random value, shown as "8" on the card 355 corresponding to the player, will have the smallest random value, shown as "2" on the card 360 corresponding to the enemy, subtracted from it to generate the amount to subtract, in this example, six. In some implementations, the game instructions 280 may indicate different rules to calculate the amount to subtract.

Once the amount to subtract from the positive accumulator value 305 or the negative accumulator value 315 is calculated, the bonus game executor 245 can determine whether to subtract that amount from the HP of the player (e.g., the positive accumulator value 305) or the HP of the enemy (e.g., the negative accumulator value 315). The bonus game executor 245 determines the accumulator from which to subtract the calculated value by determining whether the player or the enemy is a winner of the round. If the player has the larger randomly generated value (e.g., the card 355 shows a value that is larger than the card 360), then the calculated value (in this example, six) is subtracted from the negative accumulator value 315. As shown in the interface 300H, the negative accumulator value 315 is now shown as 11, when it was previously 17 in the interface 300G of FIG. 3G (before revealing the randomly generated values of the cards 355 and 360). Likewise, in the opposite case, if the enemy card 360 had a larger randomly generated value than the player card 355, the positive accumulator value 305 would have been decremented by the calculated amount. If there is a tie, neither the positive accumulator 305 nor the negative accumulator value 315 can be decremented, and the bonus game executor 245 may repeat the card flipping process (and random number generation process) as described herein.

After decrementing either the positive accumulator value 305 or the negative accumulator value 315, the bonus game executor 245 can determine whether a termination condition has been reached. The termination condition can be, for example, when either the positive accumulator value 305 or the negative accumulator value 315 reaching (or falling below) zero. Other bonus game termination conditions are also possible (e.g., a predetermined number of rounds, described herein as card flips, have occurred, etc.). If the termination condition has not been reached, the bonus game executor 245 can perform another round of the bonus game, in which the cards 355 and 360 are shown face down again as in FIG. 3G, the cards are flipped again and randomly generated numbers are displayed, and either the positive accumulator value 305 or the negative accumulator value 315 is decremented as described herein. This process may be repeated by the bonus game executor 245 until a bonus game termination condition has been reached. An example interface showing when a bonus game termination condition has been reached is shown in FIG. 3I.

Referring to FIG. 3I, illustrated is an example bonus game interface 300I showing an example game termination condition. The bonus game interface 300I can be shown after multiple rounds of the bonus game have been executed repeatedly by the bonus game executor 245, and the player HP (the positive accumulator value 305) has been reduced to (or has fallen below and set to) zero. In this case, the player has lost the bonus game, because the positive accumulator value 305 has been reduced to zero. When the bonus game is lost, a message may be displayed in the interface, shown here as "Player Defeated!" Once the player loss termination condition has been reached and the message has been displayed to the player, the bonus game executor 245 can store a value in the play information 275 that indicates the player has lost the bonus game. Similarly, if the negative accumulator value 315 is reduced to (or falls below) zero, the bonus game can reach a player win termination condition. Upon reaching a player win termination condition, the bonus game executor 245 can store a value in the play information 275 that the player has won the bonus game. In addition, a corresponding message "Player Victorious!" (not shown here) may be displayed in the bonus game interface 300I. As described above, the outcome of the bonus game depends at least in part on the positive accumulator value 305, the negative accumulator value 315, one or more random values generated by the bonus game executor 245. After reaching a termination condition, the bonus game executor 245 can cease execution of the bonus game, and the game initiator 230 can display a game interface for a base game (e.g., the slot machine game), such as the interface shown in FIG. 3A, allowing the player to request a further play of the base game.

Referring back to FIG. 2, when terminating execution of the bonus game, the bonus game executor 245 can reset one or more values of the gaming session to default values. For example, the number of plays since the last bonus game was initiated can be reset to zero, and the positive accumulator value and the negative accumulator value can be reset to a default values for the game session. In some implementations, the positive accumulator value and the negative accumulator value may persist following the decrement operations of the bonus game. Likewise, in some implementations, the number of plays since the last bonus game was initiated may persist until a threshold value is reached before being reset, thereby forcing the player to engage in a bonus game multiple times in rapid succession.

The credit adjuster 250 can adjust a credit balance based on the outcome of the bonus game and the credit accumulator value. The credit adjuster 250 can access the outcome of the bonus game by retrieving the value stored in the play information 275 by the bonus game executor 245. The value can indicate whether the player won or lost the bonus game. If the credit adjuster 250 determines that the player lost the bonus game, the credit adjuster 250 can reset the credit accumulator value to zero, and add no points to the credit balance of the player in the corresponding player profile 270. If the credit adjuster 250 determines that the player won the bonus game, the credit adjuster 250 can add the credit accumulator value to the credit balance of the player in the corresponding player profile 270, and subsequently set the credit accumulator value to zero. Other award amounts are also possible, and may be customized or predetermined according to the game instructions 280. For example, the credit adjuster 250 may apply a multiplier (e.g., two-times, four-times, six-times, etc.) to the credit accumulator value in response to a multiplier condition (e.g., having a predetermined positive accumulator value when winning the bonus game, etc.). The credit adjuster 250 may display one or more graphics, animations, messages, or alerts to the player indicating that their credit balance has increased by the credit accumulator value.

Figure 4:
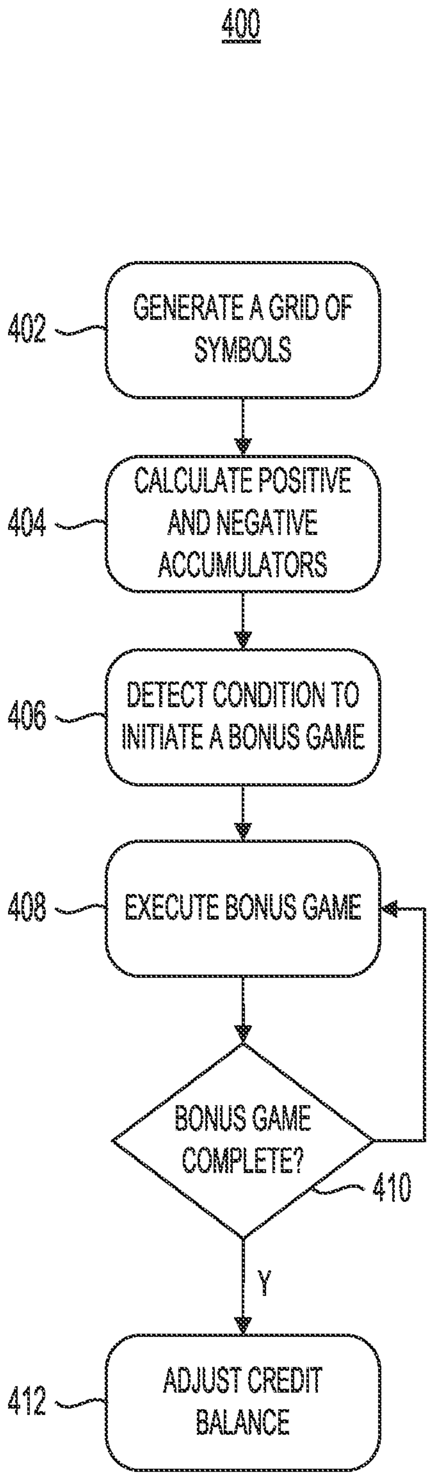
FIG. 4 illustrates an example flow diagram of a method for providing bonus games based positive and negative bonus accumulators, in accordance with one or more implementations.

Referring now to FIG. 4, depicted is an illustrative flow diagram of a method 400 for providing games having additional bonus features. The method 400 can be executed, performed, or otherwise carried out by the gaming system 205, the computer system 100 described herein in conjunction with FIGS. 1A-ID, or any other computing devices described herein. In brief overview of the method 400, the gaming system (e.g., the gaming system 205, etc.) can generate a grid of symbols (STEP 402), calculate positive and negative accumulator values (STEP 404), detect input to initiate a bonus game (STEP 406), execute a bonus game (STEP 408), determine whether the bonus game is complete (STEP 410), and adjust a credit balance (STEP 412).

In further detail of the method 400, the gaming system (e.g., the gaming system 205, etc.) can generate a grid of symbols (STEP 402). The gaming system can receive an indication of a wager on a play of a game. The indication can be transmitted by one or more of the client devices (e.g., the client devices 220), and can include an indication of a player profile (e.g., the player profile 270) with which to use for the functionalities related to the game (e.g., placing wagers using earned credits, purchasing additional credits, etc.). In some implementations, the indication can be a signal received from an acceptor device (e.g., the acceptor device 255). In such implementations, the signal may identify an amount of a wager, an identifier of a player profile corresponding to the player that initiates the play of the game, an identifier of a base game to play as part of a gaming session, or combinations thereof. The indication can be a request to play a game, and can include an identifier of a particular game to play. The indication may be a request to initiate a gaming session for a particular game (e.g., the slot machine game depicted in FIGS. 3A-3I, etc.). The gaming session may involve multiple plays with play information (e.g., the play information 275) that persists between plays. In some implementations, the gaming system can provide the client device with instructions to display one or more games to play, allowing the user to select a game from the list. In response to an interaction indicating a selection, the client device can transmit a signal identifying a game. Using the game selection, the gaming system can communicate a second user interface (e.g., similar to the user interface depicted in FIG. 3A, etc.) that prompts the user to select a wager amount.

The selected game can be, for example, a slot machine game, such as the slot machine game described in connection with FIGS. 3A-3I. A slot machine game can include providing one or spins (or virtual spins) of one or more reels of symbols in response to a wager of a number of credits. In response to initiating a play of the slot machine game, the components of the gaming system can generate one or more grids of symbols, which collectively correspond to the stopped reels of the slot machine. Upon receiving a request to initiate a game session or to initiate a play of the game, the gaming system can initiate or allocate computing resources to carry out the gaming session (or play of the game) according to game instructions (e.g., the game instructions 280) for the selected game (e.g., a slot machine game, etc.).

For example, to initiate a gaming session, the gaming system may reset or allocate resources for play information for a new game session for the requesting player profile. Allocating resources can include initiating a positive accumulator value, a negative accumulator value, and a credit accumulator value to default predetermined values. In addition, the gaming system can initiate various counters relating to the game session to predetermined values. For example, the gaming system may set a counter for a number of credits wagered by the player during the game session to zero, a counter for a number of plays of the game since the last bonus game to zero, and any other counter described herein to zero. A play of a game can be a single "round" or play-through of a game to a termination condition (e.g., a condition after which the user has won or lost the wager, etc.). For example, a play of a slot machine game may be a spin that rotates all of the reels of the slot machine until each reel has stopped and a payout amount has been determined. The termination condition for the slot machine game in this example would be when all spinning reels of the slot machine game have stopped. A gaming session may include multiple plays of the game, such that the positive and negative accumulator values persist between plays. To initiate a play of the game, the gaming system can generate a signal for the grid generator Once the game has been selected and the game session has been initiated, the gaming system can provide a user interface (e.g., similar to the user interface depicted in FIG. 3A, etc.) that prompts the player to provide a wager amount (if not already provided via the acceptor device), and initiate a play of the game. The wager amount can be a specified amount of credits, such as 1, 5, 25, 100, 500, or 1000 credits. In some implementations, the player can specify the number of credits used in the game (e.g., via one or more user interface elements, etc.) via the user interface. Once the wager is selected using the user interface, the client device can transmit a request to place the wager for the play of the game. An example of a user interface that allows a user to place a wager for a slot machine game is described herein below in conjunction with FIG. 3A.

Upon receiving player input to initiate a play of the game (e.g., via a user interface element such as the spin button 335 described in connection with FIG. 3A), the gaming system can decrease a credit balance based on the wager (or a predetermined wager amount indicated in the game instructions). Decreasing the credit balance can include subtracting the wager amount from the total credits available to the player profile. If the wager amount exceeds the total credits available, the gaming system can prompt the user to access more credits (e.g., via purchase, coupons, or using one or more codes that unlock credits, etc.). In some implementations, the game can implement a free-play mode (e.g., a demo mode), in which the user has unlimited credits (or can replenish the total credit amount indefinitely, etc.). The gaming system can compare the wager amount to the credit balance of the player profile 270 to determine whether the wager amount exceeds the credit balance. If the credit balance is not exceeded, the game initiator can cause the game to commence (e.g., set the game state in the play information to an initial state, etc.).

Upon receiving or detecting the indication begin the play of the game, the gaming system can generate, responsive to receiving the indication to begin the play of the game, a grid of one or more symbols, such as the symbols on the reels described in connection with FIGS. 3A-3F. As described herein, a play of the game can be a spin of a slot machine, which may have one or more reels. Generating the grid of symbols can include selecting a respective set of symbols for each reel of the slot machine. Each set of symbols can be selected based on one or more selection rules in the game instructions. For example, each of the symbols may have a predetermined probability of appearing on at least one real. For each symbol, the gaming system can generate a random number, and if the random number appears falls within a numerical range predetermined for a particular symbol (e.g., predetermined based on a desired probability distribution), the symbol can be selected for inclusion in the reel. In some implementations, the symbols for each reel may be predetermined, but the order in which the symbols appear on each reel may be randomized using a random number generator.

The number of reels for the slot machine may be predetermined, or may be selected by a player when initiating a gaming session or a play of the game. The gaming system can generate display instructions for the client device (or for a display device of the gaming system) to display each of the selected sets of symbols on the reels. The display instructions can show each of the reels, and the symbols thereon, rotating at predetermined rates. The display instructions may include one or more graphics for each of the symbols, or identifiers of graphics, as well as information indicating a location on each reel that the symbol is located. In some implementations, the rotation of each of the symbols can be streamed to the client device, for example, as part of a video stream. In some implementations, the rotation of the reels of symbols may be performed at the client device. The player can have an opportunity to stop each reel via an interaction with one or more user interface elements displayed at the client device (e.g., interacting with a spinning wheel may stop the reel, interacting with the interface as a whole may stop a reel, interacting with a button displayed at the client device may stop a reel, etc.).

Upon receiving an interaction to stop a reel, the gaming system can generate a portion of the grid of symbols. In some implementations, the gaming system can select a random subset of the symbols displayed on the reel to be stopped, and can display (or generate display instructions for the client device to display) the reel in a stationary position showing the subset of the symbols. In some implementations, the subset of the symbols can be selected based on the position of the reel at the time the reel is stopped. For example, the gaming system may receive, or otherwise determine, a position of the reel at the time of the interaction. The gaming system can select the symbols that were displayed to the player at the time of the interaction as the subset of symbols for that reel. In some implementations, the subset of symbols may include a predetermined number of symbols. If more than the predetermined number of symbols were displayed to the player at the time of the interaction, the gaming system can perform a tie breaking policy between the displayed symbols to select the predetermined number of symbols for the subset. Once selected, the subset of symbols can be displayed to the player on the reel, and the reel can be displayed as a stationary reel. An example of stopped reels in a slot machine game is shown in FIG. 3B.

The gaming system can complete generation of the grid of symbols after each of the reels has been stopped, either via player input or based on a predetermined time period expiring. The grid of symbols includes each of the symbols displayed on each stopped reel. In some implementations, the gaming system can generate the grid of symbols via random selection (e.g., using a random number generator to select the symbols according to probability values assigned to each symbol, etc.) prior to the reels being stopped (e.g., either by a player or otherwise). The reels, when stopped, can then display the respective portion of the grid of symbols corresponding to that reel. The grid of symbols is comprised of the symbols on each reel, when stopped, and therefore determines the outcome of the play of the game.

The gaming system can determine an award amount based on the symbols in the grid of symbols. The gaming system can adjust the credit balance based on an arrangement of the at least one symbol in the grid. The gaming system can determine an award amount based on the game instructions. For example, a pay table in the game instructions can indicate one or more types of symbols, if present, should add to the award amount, and the amount that each symbol should add to the award amount. In some implementations, the gaming system can adjust the credit balance based on an arrangement of the symbols in the grid of symbols. For example, the pay table in the game instructions can indicate one or more predetermined arrangements of symbols that correspond to predetermined award amounts. The gaming system can compare the grid of symbols to each entry in the pay table, accumulating each award amount corresponding to that entry upon detecting a match. Once each entry has been compared to the grid of symbols, the gaming system can adjust the credit balance for the player in the corresponding player profile by the accumulated award amount. The gaming system may also increment one or more values corresponding to the play of the game, such as the counter indicating the number of plays that have been completed since the last bonus game. Then, the gaming system may receive further player input that includes a request to initiate another play of the game, and the gaming system can generate a second grid of symbols using the techniques described herein.

The gaming system can calculate positive and negative accumulator values (STEP 404). The gaming system can calculate a positive accumulator value, a negative accumulator value, and a credit accumulator value based on attributes of each symbol of the grid of symbols. In addition to calculating the total award amount for the slot machine outcome (e.g., the grid of symbols), the gaming system can increment one or more values corresponding to the game state of the game session, such as the positive accumulator value, the negative accumulator value, and the credit accumulator value. As described herein, some of the symbols in the grid of symbols may be associated with an attribute that indicates an amount by which to increment a particular accumulator (e.g., positive, negative, credit, etc.). The gaming system can iterate through each symbol in the grid of symbols, and access any attributes associated with that symbol (e.g., as indicated in the game instructions, etc.).

The grid of symbols may be represented as a list of identifiers, where each position in the list corresponds to a respective position in the grid of symbols, and the entry at each position in the list includes a respective identifier of the symbol at that position. The gaming system can iterate through the list, and compare each identifier to a corresponding accumulator table stored in the game instructions. The accumulator table may be similar to a pay table, and can map identifiers of symbols to respective amounts to increment one or more of the accumulator values (e.g., the positive accumulator value, the negative accumulator value, or the credit accumulator value). The gaming system can scan through the list and accumulate each of the positive accumulator value, the negative accumulator value, and the credit accumulator value, by the amount indicated in the accumulator table for each symbol in the grid of symbols. In some implementations, the gaming system can calculate the positive accumulator value, the negative accumulator value, or the credit accumulator value at least in part based on an arrangement of the symbols in the grid. For example, the accumulator table may indicate corresponding groupings of particular symbols (e.g., two or more predetermined symbols adjacent to one another in the grid, etc.) that increment certain accumulators by predetermined amounts. The gaming system can then transmit the updated positive accumulator value, the negative accumulator value, and the credit accumulator value to the client device for display (or can display those values on a display of the gaming system). An example interface showing these values being updated is shown in FIG. 3D.

The gaming system can detect input to initiate a bonus game (STEP 406). The gaming system can detect player input to initiate a bonus game. In some implementations, the player input can be detected via a physical input device of the gaming system, such as a touch screen or a physical button on the housing of the gaming system. As described herein, the gaming system can receive player input to initiate the bonus game. The player input may be an interaction with a user interface element (e.g., the "To Battle" button 320 shown in FIGS. 3A-3F). In some implementations, the bonus game may be initiated in response to one or more in game events, such as a certain symbol appearing in the grid of symbols, or an arrangement of symbols (e.g., a row of predetermined symbols corresponding to the bonus game, etc.) appearing in the grid of symbols. In some implementations, the bonus game may be initiated in response to a condition of the game session. For example, the gaming system can initiate the bonus game in response to detecting that the number of plays of the game during the game session since the last bonus game was played is equal to, or exceeds, a predetermined threshold. In the example in FIGS. 3A-3F, the threshold is shown as fifteen. When fifteen games have completed, the gaming system can initiate the bonus game based on the positive accumulator value and the negative accumulator value.

The gaming system can execute a bonus game (STEP 408). The gaming system can execute, responsive to determining that the bonus game should be initiated, the bonus game based on the positive accumulator value and the negative accumulator value. The bonus game can be a game that is separate from the base game (e.g., in the case of FIGS. 3A-3F, a slot machine game). The instructions for the bonus game may be stored as part of the game instructions. Generally, the bonus game can be any type of game that utilizes the positive accumulator value and the negative accumulator value to provide an additional award opportunity for the player. The bonus game may be a chance based game (e.g., with an outcome determined based on one or more randomly generated values), or a skill based game (e.g., where the player can provide input at predetermined times to win a bonus award amount. To execute the bonus game, the gaming system can execute instructions for the bonus game in the game instructions. The gaming system can store or maintain all of the variables, counters, or other information for the bonus game as part of the game state data in the play information. When executing the bonus game, the gaming system can replace the grid of symbols with a bonus game interface. The gaming system can generate display instructions to display the bonus game at a client device, or at a display of the gaming system. The gaming system can execute the bonus game as described in connection with FIG. 2 and FIGS. 3G-3I.

The gaming system can determine whether the bonus game is complete (STEP 410). The gaming system can determine whether a termination condition has been reached. The termination condition can be, for example, when either the positive accumulator value or the negative accumulator value reaching (or falling below) zero. Other bonus game termination conditions are also possible (e.g., a predetermined number of rounds, described herein as card flips, have occurred, etc.). If the termination condition has not been reached, the gaming system can perform another round of the bonus game, in which the cards 355 and 360 are shown face down again as in FIG. 3G, the cards are flipped again and randomly generated numbers are displayed, and either the positive accumulator value or the negative accumulator value is decremented as described herein. This process may be repeated by the gaming system until a bonus game termination condition has been reached. An example interface showing when a bonus game termination condition has been reached is shown in FIG. 3I.

Once the termination condition has been reached and a corresponding message has been displayed to the player, the gaming system can store a value in the play information that indicates whether the player has won or lost the bonus game. As described above, the outcome of the bonus game depends at least in part on the positive accumulator value, the negative accumulator value, one or more random values generated by the gaming system. After reaching a termination condition, the gaming system can cease execution of the bonus game, and the gaming system can display a game interface for a base game (e.g., the slot machine game), such as the interface shown in FIG. 3A, allowing the player to request a further play of the base game. When terminating execution of the bonus game, the gaming system can reset one or more values of the gaming session to default values. For example, the number of plays since the last bonus game was initiated can be reset to zero, and the positive accumulator value and the negative accumulator value can be reset to a default values for the game session. In some implementations, the positive accumulator value and the negative accumulator value may persist following the decrement operations of the bonus game. Likewise, in some implementations, the number of plays since the last bonus game was initiated may persist until a threshold value is reached before being reset, thereby forcing the player to engage in a bonus game multiple times in rapid succession.

The gaming system can adjust a credit balance (STEP 412). The gaming system can adjust a credit balance based on the outcome of the bonus game and the credit accumulator value. The gaming system can access the outcome of the bonus game by retrieving the value stored in the play information by the gaming system. The value can indicate whether the player won or lost the bonus game. If the gaming system determines that the player lost the bonus game, the gaming system can reset the credit accumulator value to zero, and add no points to the credit balance of the player in the corresponding player profile. If the gaming system determines that the player won the bonus game, the gaming system can add the credit accumulator value to the credit balance of the player in the corresponding player profile, and subsequently set the credit accumulator value to zero. Other award amounts are also possible, and may be customized or predetermined according to the game instructions. For example, the gaming system may apply a multiplier (e.g., two-times, four-times, six-times, etc.) to the credit accumulator value in response to a multiplier condition (e.g., having a predetermined positive accumulator value when winning the bonus game, etc.). The gaming system may display one or more graphics, animations, messages, or alerts to the player indicating that their credit balance has increased by the credit accumulator value.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the gaming system 205 can include clients and servers. For example, the gaming system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the gaming system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for providing games having bonus award opportunities, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to memory, the one or more processors configured to:

provide, to a client device for presentation in a first user interface of a virtual slot-machine game, a plurality of symbols for a first play of the virtual slot-machine game, a game state of the virtual slot-machine game comprising a positive accumulator value, a negative accumulator value, and a credit accumulator value, each of the positive accumulator value, the negative accumulator value, and the credit accumulator value presented at respective first positions on the first user interface;

increment, based on the plurality of symbols presented in the first user interface, at least one of the positive accumulator value, the negative accumulator value, and the credit accumulator value;

determine, based on the game state of the virtual slot-machine game, that a condition to initiate a bonus game has been satisfied;

responsive to determining that the condition has been satisfied, provide the bonus game to the client device for presentation in a second user interface, the bonus game different from the virtual slot-machine game, each of the positive accumulator value, the negative accumulator value, and the credit accumulator value presented at the client device in respective graphical elements of the second user interface, each of the positive accumulator value, the negative accumulator value, and the credit accumulator value presented at respective second positions on the second user interface, the respective second positions different from the respective first positions, an outcome of the bonus game determined based on a comparison of at least two randomly generated values, the positive accumulator value, and the negative accumulator value; and adjust a credit balance by an amount calculated using the credit accumulator value responsive to the outcome of the bonus game satisfying a win condition.

2. The system of claim 1, wherein the one or more processors are further configured to adjust the credit balance further based on an award amount associated with the plurality of symbols prior to executing the bonus game.

3. The system of claim 1, wherein the one or more processors are further configured to adjust the credit balance based on an arrangement of the plurality of symbols.

4. The system of claim 1, wherein the one or more processors are further configured to provide instructions to the client device that cause the client device to present the positive accumulator value and the negative accumulator value with the plurality of symbols.

5. The system of claim 1, wherein the one or more processors are further configured to receive, from the client device, a request to begin a second play of the virtual slot-machine game.

6. The system of claim 5, wherein the one or more processors are further configured to provide, responsive to the request to begin the second play of the virtual slot-machine game, to the client device for presentation in the first user interface, a plurality of second symbols for the second play of the virtual slot-machine game.

7. The system of claim 1, wherein the one or more processors are configured to calculate the positive accumulator value based on an attribute of at least one of the plurality of symbols.

8. The system of claim 1, wherein the one or more processors are further configured to detect the condition to initiate the bonus game responsive to a determination that a predetermined number of plays of the virtual slot-machine game have been conducted since the bonus game was last executed.

9. The system of claim 1, wherein the one or more processors are further configured to detect the condition to initiate the bonus game responsive to receiving a request to initiate the bonus game from the client device.

10. A system, comprising:

a display device; and one or more processors coupled to memory, the one or more processors in communication with the display device, the one or more processors configured to:

present, via the display device, in a first user interface of a virtual slot-machine game, a plurality of symbols for a first play of the virtual slot-machine game, a game state of the virtual slot-machine game comprising a positive accumulator value, a negative accumulator value, and a credit accumulator value, each of the positive accumulator value, the negative accumulator value, and the credit accumulator value presented at respective first positions on the first user interface;

increment, based on the plurality of symbols presented in the first user interface, at least one of the positive accumulator value, the negative accumulator value, and the credit accumulator value;

determine, based on the game state of the virtual slot-machine game, that a condition to initiate a bonus game has been satisfied;

responsive to determining that the condition has been satisfied, present the bonus game on a second user interface via the display device, the bonus game different from the virtual slot-machine game, each of the positive accumulator value, the negative accumulator value, and the credit accumulator value presented in respective graphical elements of the second user interface, each of the positive accumulator value, the negative accumulator value, and the credit accumulator value presented at respective second positions on the second user interface, the respective second positions different from the respective first positions, an outcome of the bonus game determined based on a comparison of at least two randomly generated values, the positive accumulator value, and the negative accumulator value; and adjust a credit balance by an amount calculated using the credit accumulator value responsive to the outcome of the bonus game satisfying a win condition.

11. The system of claim 10, wherein the one or more processors are further configured to adjust the credit balance further based on an award amount associated with the plurality of symbols prior to executing the bonus game.

12. The system of claim 10, wherein the one or more processors are further configured to adjust the credit balance based on an arrangement of the plurality of symbols.

13. The system of claim 10, wherein the one or more processors are further configured to present, via the display device, the positive accumulator value and the negative accumulator value with the plurality of symbols.

14. The system of claim 10, further comprising an input device, and wherein the one or more processors are further configured to receive an input via the input device that indicates a request to begin a second play of the virtual slot-machine game.

15. The system of claim 14, wherein the one or more processors are further configured to present, via the display device, responsive to the request to begin the second play of the virtual slot-machine game, a plurality of second symbols for the second play of the virtual slot-machine game.

16. The system of claim 10, wherein the one or more processors are further configured to detect the condition to initiate the bonus game responsive to a determination that a predetermined number of plays of the virtual slot-machine game have been conducted since the bonus game was last executed.

17. The system of claim 10, further comprising an input device, and wherein the one or more processors are further configured to detect the condition to initiate the bonus game responsive to receiving an input via the input device that indicates a request to initiate the bonus game.

18. A method, comprising:

causing, by one or more processors coupled to memory, presentation of a plurality of symbols for a first play of a virtual slot-machine game in a first user interface of the virtual slot-machine game, a game state of the virtual slot-machine game comprising a positive accumulator value, a negative accumulator value, and a credit accumulator value, each of the positive accumulator value, the negative accumulator value, and the credit accumulator value presented at respective first positions on the first user interface;

incrementing, by the one or more processors, based on the plurality of symbols presented in the first user interface, the positive accumulator value, the negative accumulator value, and the credit accumulator value;

determine, by the one or more processors, based on the game state of the virtual slot-machine game, that a condition to initiate a bonus game has been satisfied;

responsive to determining that the condition has been satisfied, causing, by the one or more processors, presentation of the bonus game in a second user interface, the bonus game different from the virtual slot-machine game, each of the positive accumulator value, the negative accumulator value, and the credit accumulator value presented in respective graphical elements of the second user interface, each of the positive accumulator value, the negative accumulator value, and the credit accumulator value presented at respective second positions on the second user interface, the respective second positions different from the respective first positions, an outcome of the bonus game determined based on a comparison of at least two randomly generated values, the positive accumulator value, and the negative accumulator value; and adjusting, by the one or more processors, a credit balance by an amount calculated using the credit accumulator value responsive to the outcome of the bonus game.

* * * * *